(12) United States Patent
Roberts et al.

(10) Patent No.: US 8,487,148 B2
(45) Date of Patent: Jul. 16, 2013

(54) HYDROTHERMAL TREATMENT OF BIOMASS WITH HETEROGENEOUS CATALYST

(75) Inventors: Virginia M. Roberts, Summit, NJ (US); Michel Daage, Hellertown, PA (US); Paul D. Oldenburg, Easton, PA (US); James R. Bielenberg, Houston, TX (US); Paul J. Berlowitz, Glen Gardner, NJ (US); David C. Long, Ashburn, VA (US); Halou Oumar-Mahamat, Belle Mead, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 13/285,519

(22) Filed: Oct. 31, 2011

(65) Prior Publication Data
US 2012/0094879 A1    Apr. 19, 2012

Related U.S. Application Data

(60) Provisional application No. 61/422,400, filed on Dec. 13, 2010.

(51) Int. Cl.
*C10M 169/04* (2006.01)
(52) U.S. Cl.
USPC .......... 585/240; 585/241; 585/242; 585/357; 585/638; 585/733; 44/307; 44/308; 44/605; 201/20; 201/25; 201/36; 201/38

(58) Field of Classification Search
USPC ............ 585/240–242, 357, 638, 733; 201/20, 201/25, 36, 38; 208/15, 59–61, 69–70; 44/307–308, 605
See application file for complete search history.

(56) References Cited

U.S. PATENT DOCUMENTS

| | | | |
|---|---|---|---|
| 4,028,221 A | 6/1977 | Sze et al. | |
| 4,396,786 A * | 8/1983 | Bond et al. ................ | 585/240 |
| H196 H | 1/1987 | Edwards et al. | |
| 6,053,954 A | 4/2000 | Anderson et al. | |
| 6,180,845 B1 | 1/2001 | Catallo et al. | |
| 7,262,331 B2 | 8/2007 | van de Beld et al. | |
| 7,666,296 B2 | 2/2010 | Roy-Auberger | |
| 7,943,791 B2 | 5/2011 | Mcneff | |
| 7,955,508 B2 | 6/2011 | Allan et al. | |

(Continued)

FOREIGN PATENT DOCUMENTS

| | | |
|---|---|---|
| CN | 101591573 | 12/2009 |
| DE | W09915605 | 4/1999 |

(Continued)

OTHER PUBLICATIONS

Martone, P.T. et al. (2009). Current Biology, 19, 169-175.*

(Continued)

*Primary Examiner* — Brian McCaig
(74) *Attorney, Agent, or Firm* — David M. Weisberg

(57) ABSTRACT

Biomass based feeds are processed under hydrothermal treatment conditions, e.g., to produce a hydrocarbon liquid product and a solids portion. The hydrothermal treatment can be performed in the presence of heterogeneous catalyst particles that can optionally include a catalyst metal or metal salt. The presence of the heterogeneous catalyst can modify the nature of the hydrocarbon products produced from the hydrothermal treatment.

19 Claims, 4 Drawing Sheets

U.S. PATENT DOCUMENTS

| | | | |
|---|---|---|---|
| 8,075,642 | B2 | 12/2011 | Dumesic et al. |
| 2008/0050792 | A1* | 2/2008 | Zmierczak et al. ............ 435/161 |
| 2008/0058563 | A1 | 3/2008 | Dumesic |
| 2008/0160593 | A1 | 7/2008 | Oyler |
| 2008/0188676 | A1 | 8/2008 | Anderson et al. |
| 2009/0084026 | A1 | 4/2009 | Miller |
| 2009/0090046 | A1 | 4/2009 | O'Connor et al. |
| 2009/0158638 | A1 | 6/2009 | Hatcher et al. |
| 2009/0308787 | A1 | 12/2009 | O'Connor et al. |
| 2010/0050502 | A1* | 3/2010 | Wu et al. ......................... 44/308 |
| 2010/0076238 | A1* | 3/2010 | Brandvold et al. ............ 585/324 |
| 2010/0137665 | A1* | 6/2010 | Chen ............................. 585/320 |
| 2010/0154305 | A1 | 6/2010 | Elliott et al. |
| 2010/0170147 | A1 | 7/2010 | McNeff et al. |
| 2010/0176026 | A1 | 7/2010 | Cole et al. |
| 2010/0228067 | A1 | 9/2010 | Peterson et al. |
| 2010/0233761 | A1 | 9/2010 | Czartoski et al. |
| 2011/0245444 | A1 | 10/2011 | Miller et al. |
| 2011/0287503 | A1 | 11/2011 | Lupton et al. |
| 2012/0090223 | A1 | 4/2012 | Kokayeff et al. |

FOREIGN PATENT DOCUMENTS

| | | |
|---|---|---|
| EP | 429995 | 2/1996 |
| GB | 2166154 A | 4/1986 |
| JP | 5244908 | 9/1993 |
| JP | 2009191008 | 8/2009 |
| JP | 2009242202 A | 10/2009 |
| US | W09630464 | 10/1996 |
| WO | 9630464 A1 | 10/1996 |
| WO | 9915605 A1 | 4/1999 |
| WO | 2010021753 A1 | 2/2010 |
| WO | 2010030196 A1 | 3/2010 |
| WO | 2010030197 A1 | 3/2010 |
| WO | 2010134077 A2 | 11/2010 |
| WO | 2011126382 A1 | 10/2011 |

OTHER PUBLICATIONS

Edwards et al., United States Statutory Invention Registration, Reg. No. H196, Published Jan. 6, 1987.

Elliot "Catalytic hydrothermal gasification of biomass." Sustainable Chemistry and Green Chemistry (online), Apr. 14, 2008 [Retrieved on Mar. 20, 2012], vol. 2, Iss. 3, pp. 254-265, Retrieved from the Internet; <URL:http://onlinelibrary.wiley.com/doi/10.1002/bbb.74/abstract>, see the entire document, especially Figures 1, 2; Tables 1-5.

Biomass resource facilities and biomass conversion processing for fuels and chemicals, Energy Conversion and Management (Jul. 2001) vol. 42, No. 11, pp. 1357-1378.

"Hydrogen production by gasification of glucose and wet biomass in supercritical water," Advances in Hydrogen Energy (1990), 8, vol. 1, pp. 345-355.

"Recent progress in converting biomass to biofuels and renewable chemicals in sub- or supercritical water," Biofuels (2010), vol. 1, No. 1, pp. 109-128.

"Towards sustainable production of biofuels from microalgae," International Journal of Molecular Sciences (2008), vol. 9, No. 7, pp. 1185-1195.

S. Inoue, et al., "Analysis of oil derived from liquefaction of Botryococcus braunii," Biomass & Bioenergy (1994) vol. 6, No. 4, pp. 269-274.

"Antioxidants in plant foods and microalgae extracted using compressed fluids," EJEAFChe, Electronic Journal of Environmental, Agricultural and Food Chemistry (2008), vol. 7, No. 8, pp. 3301-3309.

Sekiyu Gakkaishi, "Thermochemical liquefaction of biomass wastes and unused biomass," National Institute Resources and Environment, 1998, vol. 41, No. 1, pp. 11-21 Abstract Only.

Y. Dote, et al., "Recovery of liquid fuel from hydro-carbon-rich microalgae by thermochemical liquefaction," Fuel (1994), vol. 73, No. 12, pp. 1855-1857.

T. Minowa, et al., "Oil production from algal cells of Dunaliella tertiolecta by direct thermochemical liquefaction," Fuel (1995), vol. 74, No. 12, pp. 1735-1738.

"Method for extracting brown algae belonging to Phaeophyceace class for obtaining functional components including fucoxanthin and fucosterol, involves subjecting brown algae to extraction using supercritical fluid," South Prod KK.

"Comments on "Thermochemical catalytic liquefaction of the marine microalgae duanaliella tertiolecta and characterization of bio-oils" by Zou et al.," Energy & Fuels (2009), vol. 23, No. 12, pp. 6275-6276.

"Catalytic decomposition of organic wastes and biomass—comprises reacting with carbon-contag. catalyst in reaction medium at high pressure and supercritical temp." Univ Hawaii.

Y.F. Yang,e t al. "Analysis of energy conversion characteristics in liquefaction of algae," Resources, Conservation and Recycling (Dec. 2004), Vol. 43, No. 1, pp. 21-33.

Zou Shuping, "Thermochemical catalytic liquefaction of microalgae and properties of bio-oil," Taiyangneng Xuebao/ Acta Energiae Solaris Sinica (Nov. 2009), vol. 30, No. 11, pp. 1571-1576 Abstract Only.

Tylisha M. Brown, et al., "Hydrothermal Liquefaction and Gasification of Nannochloropsis sp.," Energy & Fuels (2010), vol. 24, pp. 3639-3646.

Ayhan Demirbas, "Use of algae as biofuel sources," Energy Conversion and Management (2010) vol. 51, No. 12, pp. 2738-2749.

A.B. Ross, et al., "Hydrothermal processing of microalgae using alkali and organic acids," Fuel (2010), vol. 89, No. 9, pp. 234-2243.

Dong Zhou, et al., "Hydrothermal Liquefaction of Macroalgae Enteromorpha prolifera to Bio-oil," Energy & Fules (2010) vol. 24, No. 7, pp. 4054-4061.

Miguel Herrero, et al., "Sub- and supercritical fluid extraction of functional ingredients from different natural sources: Plants, food-by-products, algae and microalgae: A review," Food Chemistry (2006), vol. 98, No. 1, pp. 136-148.

Shigeki Sawayama, et al., "$CO_2$ fixation and oil production through microalga," Energy Conversion and Management (1995), vol. 36, Nos. 6-9, pp. 729-731.

S. Sawayama, et al., "Possibility of renewable energy production and $CO_2$ mitigation by thermochemical liquefaction of microalgae," Biomass and Bioenergy (1999), vol. 17, No. 1, pp. 33-39.

* cited by examiner

US 8,487,148 B2

HYDROTHERMAL TREATMENT OF BIOMASS WITH HETEROGENEOUS CATALYST

CROSS-REFERENCE TO RELATED APPLICATIONS

This application relates to and claims priority to U.S. Provisional Patent Application No. 61/422,400 of the same title filed Dec. 13, 2010.

This application is also related to the following co-pending, commonly assigned, applications: (1) U.S. patent application Ser. No. 13/285,691 entitled "Phosphorus Recovery from Hydrothermal Treatment of Biomass" filed Oct. 31, 2011 which claims priority to U.S. Provisional Patent Application No. 61/422,455 of the same title filed Dec. 13, 2010; (2) U.S. patent application Ser. No. 13/285,743 entitled "Catalyst Recovery in Hydrothermal Treatment of Biomass" filed Oct. 31, 2011 which claims priority to U.S. Provisional Patent Application No. 61/422,438 of the same title filed Dec. 13, 2010 and (3) U.S. patent application Ser. No. 13/285,787 entitled "Catalytic Hydrothermal Treatment of Biomass" filed Oct. 31, 2011 which claims priority to U.S. Provisional Patent Application No. 61/422,427 of the same title filed Dec. 13, 2010.

The contents of each of the above applications are hereby incorporated by reference in their entirety

FIELD OF THE INVENTION

This invention relates to hydrothermal treatment of various types of biomass, such as algae, to produce hydrocarbon products, such as distillate fuel.

BACKGROUND OF THE INVENTION

Conventional production of fuels and lubricants is still dominated by conversion of mineral petroleum feeds into desired products. In order to supplement and/or replace the conventional sources with renewable forms of energy, a variety of problems must be overcome.

One alternative to conventional fuels and lubricants is to produce comparable fuels and lubricants based on biomass. One advantage of biomass based fuels is that the resulting fuel product may be compatible with existing infrastructure and technologies. Ideally, biomass based fuels and lubricants could be used in a "drop-in" fashion in place of conventional products, allowing the use of a renewable product without having to modify existing equipment.

One option for processing of a biomass type feed is hydrothermal processing. Hydrothermal processing involves exposing a feed to water under elevated temperature and pressure conditions. U.S. Pat. No. 6,180,845 provides an example of this type of process. This patent describes a process for transforming biomass to hydrocarbon mixtures using near-critical or supercritical water. The process can be used on a variety of initial biomass materials. The biomass is processed at pressures from 200 bars (20 MPa) to 500 bars (50 MPa) and at temperatures from 320° C. to 500° C. The atmosphere in the reactor is described as non-oxidizing, and hydrogen is included in an example. About 4 hours is noted as a preferred processing time. The hydrothermal processing is described as producing a "petroleum like liquid", which appears to include a substantial portion of aromatic and polymeric species, as well as some soot and/or carbonized residues. The description mentions that some metals present in the biomass feed, such as Ni or Fe, can alter the types of products generated. The description also mentions that metals can be used to simplify the components of the product mixture, or to remove unwanted compounds. The only metal specifically mentioned as an additive is Cu metal for removal of sulfur compounds such as thiophenes. Nitrogen compounds are identified as another product that can be removed by precipitation with metals, although no examples of a suitable metal are provided. It appears from the description that the additive metals used are "reduced metals", as opposed to metals in an oxidized state.

PCT Publication No. WO 96/30464 provides another example of processing of biomass at supercritical conditions. The application describes processing of wet biomass, such as algae or water hyacinth, to produce gaseous hydrocarbons and hydrogen. The conversion conditions include contacting the biomass with water under supercritical conditions, which is defined as having a temperature of greater than 374° C. and a pressure greater than 22.1 MPa. The conversion takes place in the presence of a carbon based catalyst, such as charcoal or an activated carbon with a high surface area. The process is described as providing rapid and virtually complete gasification of organic matter in a feedstock.

SUMMARY OF THE INVENTION

In one aspect of the invention, a method is provided for hydrothermally processing biomass. The method includes contacting a biomass feed, such as an algae-based feed, with water in the presence of catalyst particles and a reducing gas under effective hydrothermal processing conditions to produce a multi-phase product. The multi-phase product can be separated to produce at least a gas phase portion, a liquid hydrocarbon product, an aqueous portion, and a solids portion.

In another aspect of the invention, another method for hydrothermally processing biomass is provided. The method includes contacting a biomass feed, such as an algae-based feed, with water in the presence of hydrothermal catalyst particles under effective hydrothermal processing conditions to produce a multi-phase product. The liquid hydrocarbon product can be separated from the multi-phase product. At least a portion of the liquid hydrocarbon product can be hydroprocessed in the presence of a hydroprocessing catalyst under effective hydroprocessing conditions.

In still another aspect of the invention, still another method for hydrothermally processing biomass is provided. The method includes contacting a biomass feed with water in the presence of catalyst particles and a reducing gas under effective hydrothermal processing conditions to produce a multi-phase product, the catalyst particles including activated carbon and/or an oxidized metal. The multi-phase product can be separated to produce at least a gas phase portion, a liquid hydrocarbon product, an aqueous portion, and a solids portion.

DETAILED DESCRIPTION OF THE EMBODIMENTS

Overview

Figure 1:
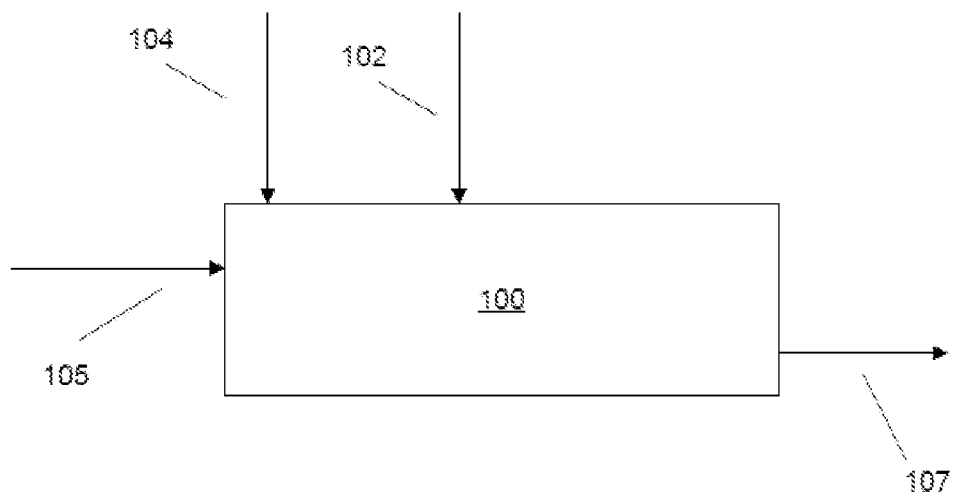
FIG. 1 depicts a reaction system suitable for performing a process according to an embodiment of the invention.

In various embodiments, catalytic methods are provided for hydrothermal treatment of algae feeds (or other biomass based feeds) to produce distillate boiling range products. The hydrothermal treatment can include processing of biomass feeds in the presence of water at supercritical or near-supercritical temperatures and pressures. Hydrothermal treatment of an algae feed in the presence of a catalyst can allow for conversion of biomass into molecules having a desired boiling range while also removing at least a portion of impurities that may be less desirable in a distillate product, such as nitrogen impurities, oxygen impurities, phosphorus impurities, olefin impurities, aromatic impurities, metal impurities, and the like.

Algae can contain significant amounts of products such as triglycerides, fatty acids/alcohols, and isoprenoids, which can be converted to valuable products such as transportation fuels and lubricants. However, a number of challenges exist in converting an algae feed into a usable product. One challenge is recovering the desired hydrocarbon molecules from the algae. An option for recovering hydrocarbon products from algae can be to use a solvent extraction based method. Unfortunately, some solvent based methods require use of an algae source that contains little or no water. Dehydration of an algae source to a sufficient degree to allow for this type of solvent extraction can require a high cost of operation. Alternative solvent extraction methods can allow for extraction from an algae sample that contains water. However, a high cost step usually remains, as the solvent has to be separated from the water, for example by distillation.

As an alternative to solvent extraction, hydrothermal processing can be used to extract hydrocarbon products from an algae source. Hydrothermal processing has the advantage that it can be performed without vaporizing water, which can reduce the cost of the process. However, another difficulty with using biomass to produce hydrocarbon products can be the presence of impurities in the biomass. An algae feed can have a relatively high concentration of molecules that contain, inter alia, sulfur, nitrogen, oxygen, phosphorus, Group I metals, Group II metals, transition metals, olefinic groups, and aromatic groups. Due to the high impurity levels, additional processing can be required before the hydrocarbon products from non-catalytic hydrothermal processing can be used in conventional processes.

Adding a catalyst to the hydrothermal processing of biomass can reduce the impurity levels in distillate boiling range products. For an algae based feed, the total yield of hydrocarbon products and/or distillate boiling range products may be increased or decreased, depending on the catalyst. However, the suitability of the distillate boiling range products can be enhanced. This can allow a single process of catalytic hydrothermal processing to produce a distillate boiling range product suitable for further processing, e.g., in a process such as hydrotreatment and/or dewaxing, which may be conventional.

Feedstocks

In various embodiments of the invention, an algae feed or another biomass based feed can be processed using catalytic hydrothermal processing. In such embodiments, the feed can typically contain algae and water, and optionally can contain additional feed from another biocomponent source, where a biocomponent source is any source including and/or derived from biological material, such as from plants, animals, microbes, algae, or a combination thereof. Additionally or alternately, the feed can be a feed derived from a starting mixture containing algae and water, and can optionally contain feed from another biocomponent source. Further additionally or alternately, the feed can generally be a feed based on biomass.

It is noted that the water present in an algae (or other biomass) feed can include extracellular water and/or intracellular water. Intracellular water refers to water contained within the cell membrane of a cell, such as an algae cell. For an algae feed, a feed that appears relatively dry based on extracellular water content, can still contain a substantial portion of intracellular water. For algae whose cell walls have been ruptured (e.g., substantially dried/dewatered algae), the algae feed can only contain extracellular water (as ruptured cells do not have an inside, but only an outside). For an algae feed that contains intracellular water, computing the ratio of water to (dry) algae requires determining what portion of the algae weight is due to intracellular water, as the intracellular water should count toward the weight of water and not the weight of dry algae. As a clarifying example, an algae sample could include no extracellular water and still have a water to algae ratio of about 1:1 or greater, for example about 2:1 or greater, due to the amount of intracellular water in the algae. Thus, references herein to the weight of algae refer to the weight of dry algae, excluding intracellular water.

For a feed containing at least algae and water, the algae content of the feed can be at least about 5 wt %, for example at least about 10 wt %, at least about 20 wt %, at least about 25 wt %, or at least about 30 wt %. Additionally or alternately, the algae content of the feed can be about 50 wt % or less, for example about 30 wt % or less, about 25 wt % or less, or about 20 wt % or less. In terms of ratios, the ratio of water to algae in the feed can be at least about 1:1, for example at least about 2:1, at least about 3:1, or at least about 4:1. Additionally or alternately, the ratio of water to algae can be about 25:1 or less, for example about 20:1 or less or about 10:1 or less. In some embodiments, the algae content of the feed relative to the amount of water can be based on practical considerations regarding extraction of water from the source of the algae. Thus, in some embodiments, algae can be introduced into a reactor as a mixture or paste of algae and water. Additionally or alternately, a dried form of algae can be introduced into a reactor along with sufficient water, e.g., to reach a desired ratio of algae to water.

Algae oils or lipids are typically contained in algae in the form of membrane components, storage products, and/or metabolites. Certain algal strains, particularly microalgae such as diatoms and cyanobacteria, can contain proportionally high levels of lipids. Algal sources for the algae oils can contain varying amounts, e.g., from 2 wt % to 80 wt % of lipids, based on total weight of the biomass itself.

Algal sources for algae oils can include, but are not limited to, unicellular and multicellular algae. Examples of such algae can include a rhodophyte, chlorophyte, heterokontophyte, tribophyte, glaucophyte, chlorarachniophyte, euglenoid, haptophyte, cryptomonad, dinoflagellum, phytoplankton, and the like, and combinations thereof. In one embodiment, algae can be of the classes Chlorophyceae and/or Haptophyta. Specific species can include, but are not limited to, *Neochloris oleoabundans, Scenedesmus dimorphus, Euglena gracilis, Phaeodactylum tricornutum, Pleurochrysis carterae, Prymnesium parvum, Nannochloropsis gaditiana, Tetraselmis chui, Tetraselmis tertiolecta, Dunaliella salina*, various species of *Chlorella*, and *Chlamydomonas reinhardtii*. Nonlimiting examples of additional or alternate algal sources include one or more microalgae of the *Achnanthes, Amphiprora, Amphora, Ankistrodesmus, Asteromonas,*

*Boekelovia, Borodinella, Botryococcus, Bracteococcus, Chaetoceros, Carteria, Chlamydomonas, Chlorococcum, Chlorogonium, Chlorella, Chroomonas, Chrysosphaera, Cricosphaera, Crypthecodinium, Cryptomonas, Cyclotella, Dunaliella, Ellipsoidon, Emiliania, Eremosphaera, Ernodesmius, Euglena, Franceia, Fragilaria, Gloeothamnion, Haematococcus, Halocafeteria, Hymenomonas, Isochrysis, Lepocinclis, Micractinium, Monoraphidium, Nannochloris, Nannochloropsis, Navicula, Neochloris, Nephrochloris, Nephroselmis, Nitzschia, Ochromonas, Oedogonium, Oocystis, Ostreococcus, Pavlova, Parachlorella, Pascheria, Phaeodactylum, Phagus, Platymonas, Pleurochrysis, Pleurococcus, Prototheca, Pseudochlorella, Pyramimonas, Pyrobotrys, Scenedesmus, Skeletonema, Spyrogyra, Stichococcus, Tetraselmis, Thalassiosira, Viridiella*, and *Volvox* species, and/or one or more cyanobacteria of the *Agmenellum, Anabaena, Anabaenopsis, Anacystis, Aphanizomenon, Arthrospira, Asterocapsa, Borzia, Calothrix, Chamaesiphon, Chlorogloeopsis, Chroococcidiopsis, Chroococcus, Crinalium, Cyanobacterium, Cyanobium, Cyanocystis, Cyanospira, Cyanothece, Cylindrospermopsis, Cylindrospermum, Dactylococcopsis, Dermocarpella, Fischerella, Fremyella, Geitleria, Geitlerinema, Gloeobacter, Gloeocapsa, Gloeothece, Halospirulina, Iyengariella, Leptolyngbya, Limnothrix, Lyngbya, Microcoleus, Microcystis, Myxosarcina, Nodularia, Nostoc, Nostochopsis, Oscillatoria, Phormidium, Planktothrix, Pleurocapsa, Prochlorococcus, Prochloron, Prochlorothrix, Pseudanabaena, Rivularia, Schizothrix, Scytonema, Spirulina, Stanieria, Starria, Stigonema, Symploca, Synechococcus, Synechocystis, Tolypothrix, Trichodesmium, Tychonema*, and *Xenococcus* species.

After catalytic hydrothermal processing, a portion of the products from catalytic hydrothermal processing can be combined with biocomponent and/or mineral based feeds. The combined feedstock can include varying amounts of feedstreams based on biocomponent sources. When desired, the feed can include at least about 0.1 wt % of feed based on a biocomponent source, for example at least about 0.5 wt %, at least about 1 wt %, at least about 3 wt %, at least about 10 wt %, at least about 15 wt %, at least about 25 wt %, at least about 50 wt %, or at least about 75 wt %. In such embodiments, the feed can additionally or alternately include about 100 wt % or less of biocomponent, for example about 90 wt % or less, about 75 wt % or less, or about 50 wt % or less. In other embodiments, the amount of biocomponent feed (e.g., for co-processing with the mineral oil portion of the feed) can be relatively small, for instance with a feed that includes at least about 0.5 wt % of feedstock based on a biocomponent source, e.g., at least about 1 wt %, at least about 2.5 wt %, or at least about 5 wt %, at least about 10 wt %, or at least about 20 wt %. In such embodiments, the feed can additionally or alternately include about 50 wt % or less of biocomponent based feedstock, for example about 25 wt % or less, about 20 wt % or less, about 10 wt % or less, or about 5 wt % or less.

In various embodiments of the invention, the combined feedstock can include feeds from various biomass or biocomponent sources, such as vegetable (higher plant), animal, fish, and/or algae. Generally, these biocomponent sources can include vegetable fats/oils, animal fats/oils, fish oils, pyrolysis oils, and algae lipids/oils, as well as components of such materials, and in some embodiments can specifically include one or more type of lipid compounds. Lipid compounds are typically biological compounds that are insoluble in water, but soluble in nonpolar (or fat) solvents. Non-limiting examples of such solvents include alcohols, ethers, chloroform, alkyl acetates, benzene, and combinations thereof.

Major classes of lipids include, but are not necessarily limited to, fatty acids, glycerol-derived lipids (including fats, oils and phospholipids), sphingosine-derived lipids (including ceramides, cerebrosides, gangliosides, and sphingomyelins), steroids and their derivatives, terpenes and their derivatives, fat-soluble vitamins, certain aromatic compounds, and long-chain alcohols and waxes.

In living organisms, lipids generally serve as the basis for cell membranes and as a form of fuel storage. Lipids can also be found conjugated with proteins or carbohydrates, such as in the form of lipoproteins and lipopolysaccharides.

Examples of vegetable oils that can be used in accordance with this invention include, but are not limited to rapeseed (canola) oil, soybean oil, coconut oil, sunflower oil, palm oil, palm kernel oil, peanut oil, linseed oil, tall oil, corn oil, castor oil, jatropha oil, jojoba oil, olive oil, flaxseed oil, camelina oil, safflower oil, babassu oil, tallow oil and rice bran oil.

Vegetable oils as referred to herein can also include processed vegetable oil material. Non-limiting examples of processed vegetable oil material include fatty acids and fatty acid alkyl esters. Alkyl esters typically include $C_1$-$C_5$ alkyl esters. One or more of methyl, ethyl, and propyl esters are preferred.

Examples of animal fats that can be used in accordance with the invention include, but are not limited to, beef fat (tallow), hog fat (lard), turkey fat, fish fat/oil, and chicken fat. The animal fats can be obtained from any suitable source including restaurants and meat production facilities.

Animal fats as referred to herein also include processed animal fat material. Non-limiting examples of processed animal fat material include fatty acids and fatty acid alkyl esters. Alkyl esters typically include $C_1$-$C_5$ alkyl esters. One or more of methyl, ethyl, and propyl esters are preferred.

Other biocomponent feeds usable in the present invention can include any of those which comprise primarily triglycerides and free fatty acids (FFAs). The triglycerides and FFAs typically contain aliphatic hydrocarbon chains in their structure having from 8 to 36 carbons, preferably from 10 to 26 carbons, for example from 14 to 22 carbons. Types of triglycerides can be determined according to their fatty acid constituents. The fatty acid constituents can be readily determined using Gas Chromatography (GC) analysis. This analysis involves extracting the fat or oil, saponifying (hydrolyzing) the fat or oil, preparing an alkyl (e.g., methyl) ester of the saponified fat or oil, and determining the type of (methyl) ester using GC analysis. In one embodiment, a majority (i.e., greater than 50%) of the triglyceride present in the lipid material can be comprised of $C_{10}$ to $C_{26}$ fatty acid constituents, based on total triglyceride present in the lipid material. Further, a triglyceride is a molecule having a structure identical to the reaction product of glycerol and three fatty acids. Thus, although a triglyceride is described herein as being comprised of fatty acids, it should be understood that the fatty acid component does not necessarily contain a carboxylic acid hydrogen. In one embodiment, a majority of triglycerides present in the biocomponent feed can preferably be comprised of $C_{12}$ to $C_{18}$ fatty acid constituents, based on total triglyceride content. Other types of feed that are derived from biological raw material components can include fatty acid esters, such as fatty acid alkyl esters (e.g., FAME and/or FAEE).

Biocomponent based diesel boiling range feedstreams can have a wide range of nitrogen and/or sulfur contents. For example, a biocomponent based feedstream based on a vegetable oil source can contain up to about 300 wppm nitrogen. In contrast, a biomass based feedstream containing whole or ruptured algae can sometimes include a higher nitrogen content. Depending on the type of algae, the nitrogen content of an algae based feedstream can be at least about 2 wt %, for example at least about 3 wt %, at least about 5 wt %, or at least about 10 wt %, and algae with still higher nitrogen contents are known. The sulfur content of a biocomponent feed can also vary. In some embodiments, the sulfur content can be about 500 wppm or less, for example about 100 wppm or less, about 50 wppm or less, or about 10 wppm or less.

Aside from nitrogen and sulfur, oxygen can be another heteroatom component in biocomponent based feeds. A biocomponent diesel boiling range feedstream based on a vegetable oil, prior to hydrotreatment, can include up to about 10 wt % oxygen, for example up to about 12 wt % or up to about 14 wt %. Additionally or alternately, such a biocomponent diesel boiling range feedstream can include at least about 1 wt % oxygen, for example at least about 2 wt %, at least about 3 wt %, at least about 4 wt %, at least about 5 wt %, at least about 6 wt %, or at least about 8 wt %. Further additionally or alternately, a biocomponent feedstream, prior to hydrotreatment, can include an olefin content of at least about 3 wt %, for example at least about 5 wt % or at least about 10 wt %.

A mineral hydrocarbon feedstock refers to a conventional (e.g., non-biocomponent) hydrocarbon feedstock, typically derived from crude oil and that has optionally been subjected to one or more separation and/or other refining processes. In one preferred embodiment, the mineral hydrocarbon feedstock can be a petroleum feedstock boiling in the diesel range or above. Examples of suitable feedstocks can include, but are not limited to, virgin distillates, hydrotreated virgin distillates, kerosene, diesel boiling range feeds (such as hydrotreated diesel boiling range feeds), light cycle oils, atmospheric gasoils, and the like, and combinations thereof.

Mineral feedstreams for blending with a biocomponent feedstream can have a nitrogen content from about 50 wppm to about 2000 wppm nitrogen, for example from about 50 wppm to about 1500 wppm or from about 75 to about 1000 wppm. In some embodiments, the mineral feedstream can have a sulfur content from about 100 wppm to about 10,000 wppm sulfur, for example from about 200 wppm to about 5,000 wppm or from about 350 wppm to about 2,500 wppm. Additionally or alternately, the combined (biocomponent plus mineral) feedstock can have a sulfur content of at least about 5 wppm, for example at least about 10 wppm, at least about 25 wppm, at least about 100 wppm, at least about 500 wppm, or at least about 1000 wppm. Further additionally or alternately, the combined feedstock can have a sulfur content of about 2000 wppm or less, for example about 1000 wppm or less, about 500 wppm or less, about 100 wppm or less, or about 50 wppm or less. Still further additionally or alternately, the nitrogen content of the combined feedstock can be about 1000 wppm or less, for example about 500 wppm or less, about 100 wppm or less, about 50 wppm or less, about 30 wppm or less, about 20 wppm or less, or about 10 wppm or less.

The content of sulfur, nitrogen, oxygen, and olefins in a feedstock created by blending two or more feedstocks can typically be determined using a weighted average based on the blended feeds. For example, a mineral feed and a biocomponent feed can be blended in a ratio of 80 wt % mineral feed and 20 wt % biocomponent feed. If the mineral feed has a sulfur content of about 1000 wppm, and the biocomponent feed has a sulfur content of about 10 wppm, the resulting blended feed could be expected to have a sulfur content of about 802 wppm.

Diesel boiling range feedstreams suitable for use in the present invention tend to boil within the range of about 215° F. (about 102° C.) to about 800° F. (about 427° C.). Preferably, the diesel boiling range feedstream has an initial boiling point of at least about 215° F. (about 102° C.), for example at least about 250° F. (about 121° C.), at least about 275° F. (about 135° C.), at least about 300° F. (about 149° C.), at least about 325° F. (about 163° C.), at least about 350° F. (about 177° C.), at least about 400° F. (about 204° C.), or at least about 451° F. (about 233° C.). Preferably, the diesel boiling range feedstream has a final boiling point of about 800° F. (about 427° C.) or less, or about 775° F. (about 413° C.) or less, or about 750° F. (about 399° C.) or less. In some embodiments, the diesel boiling range feedstream can have a boiling range from about 451° F. (about 233° C.) to about 800° C. (about 427° C.). Additionally or alternately, the feedstock can be characterized by the boiling point required to boil a specified percentage of the feed. For example, the temperature required to boil at least 5 wt % of a feed is referred to as a "T5" boiling point. In one embodiment, the mineral oil feedstock can have a T5 boiling point of at least about 230° F. (about 110° C.), for example at least about 250° F. (about 121° C.) or at least about 275° F. (about 135° C.). Further additionally or alternately, the mineral hydrocarbon feed can have a T95 boiling point of about 775° F. (about 418° C.) or less, for example about 750° F. (about 399° C.) or less or about 725° F. (about 385° C.) or less. In another embodiment, the diesel boiling range feedstream can also include kerosene range compounds to provide a feedstream with a boiling range from about 250° F. (about 121° C.) to about 800° F. (about 427° C.).

Catalyst for Catalytic Hydrothermal Processing

In various embodiments, hydrothermal processing can be performed in the presence of a catalyst, such as one or a combination of catalysts, e.g., those disclosed hereinbelow. In the embodiments described below, the catalyst can be a supported catalyst suitable for use in the hydrothermal processing reaction environment and having any suitable particle size and/or particle size distribution. Additionally or alternately, the catalyst can be a particulate catalyst with limited or substantially no solubility in the fluids present in the hydrothermal processing reaction environment.

One catalyst option can be to use a supported catalyst including a noble metal (e.g., Pt, Pd, Rh, Ru, Ir, or a combination thereof). Additionally or alternately, the support for the catalyst can be a hydrothermally stable support. Examples of suitable supports can include, but are not limited to, refractory oxides such as titania and/or zirconia; silica; activated carbon; carbon on which is deposited one or more metals selected from titanium, zirconium, vanadium, molybdenum, manganese, and cerium; magnesium oxides; hydrotalcites; other various types of clays; and combinations thereof, such as a mixture of two or more of titania, zirconia, and silica. Additionally or alternately, the support material can be substantially free of alumina. As used herein, "substantially free" of alumina should be understood to mean less than 1 wt % alumina, preferably less than 0.1 wt % alumina, for example less than 0.01 wt % of alumina, completely no added alumina, or completely no alumina.

Another catalyst option can be to use a basic metal or mixed metal oxide with or without a noble metal. Examples of such catalysts without a noble metal can include, but are not limited to, magnesium oxide, hydrotalcites, potassium supported on titania and/or zirconia, and combinations thereof.

Still another catalyst option can be to use hydroprocessing type metals supported on a suitable support. Examples of hydroprocessing type metals can include, but are not limited to, a combination of a Group VIII metal (such as Co and/or Ni) with a Group VIB metal (such as Mo and/or W). Combinations of three or more Group VIII and/or Group VI metals can additionally or alternately be used (e.g., NiMoW, CoNiMo, CoMoW, and the like). Suitable support materials include those identified hereinabove.

In some embodiments, the catalyst metals can be present on the catalyst in the form of an oxide or a sulfide. Additionally or alternately, catalyst metals can be present in a metallic state. Further additionally or alternately, catalyst metals can be present on a support in any convenient form. Examples can include metal salts such as metal acetates, metal carbonates, or other organometallic forms.

Relative to the amount of algae, the amount of catalyst in the reactor (reaction zone) can be at least about 0.05 wt %, for example at least about 0.1 wt %, at least about 1 wt %, at least about 2.5 wt %, or at least about 5 wt %. Additionally or alternately, the amount of catalyst in the reactor (reaction zone) can be about 20 wt % or less relative to the amount of algae, for example about 15 wt % or less or about 10 wt % or less.

The amount of metal supported on the catalyst can be varied. Relative to the weight of the catalyst, the amount of noble metal supported on the catalyst, when present, can be at least about 0.1 wt %, for example at least about 0.5 wt %, at least about 0.6 wt %, at least about 0.75 wt %, or at least about 1.0 wt %, based on the total catalyst weight. Additionally or alternately, the amount of noble metal supported on the catalyst, when present, can be about 1.5 wt % or less, for example about 1.0 wt % or less, about 0.75 wt % or less, or about 0.6 wt % or less, based on the total catalyst weight. More generally, the amount of metal(s), individually or in mixtures, on the catalyst support can be at least about 0.1 wt %, for example at least about 0.25 wt %, at least about 0.5 wt %, at least about 0.6 wt %, at least about 0.75 wt %, at least about 1 wt %, at least about 2.5 wt %, or at least about 5 wt %, based on the total catalyst weight. Additionally or alternately, the amount of metal(s), individually or in mixtures, on the catalyst support can be about 35 wt % or less, for example about 20 wt % or less, about 15 wt % or less, about 10 wt % or less, or about 5 wt % or less, based on the total catalyst weight.

Additionally or alternately, the particle size for the catalyst particles can be varied, e.g., selected to facilitate separation of the catalyst particles from other solids. In such an embodiment, the catalyst particles can have an average particle size of at least about 1000 μm, for example at least about 1500 μm or at least about 2000 μm. To achieve a desired catalyst particle size, catalysts can optionally be formulated to include a hydrothermally stable binder material, in addition to the support material and any active metals, if present. Suitable hydrothermally stable binder materials can be similar to materials used as a support material and/or can include, but are not necessarily limited to, an oxide of one or more metals selected from silicon, titanium, zirconium, vanadium, molybdenum, manganese, and cerium. For a supported catalyst that is formulated with a binder, the support material can function as a binder, or a different material can be used as a binder.

Catalytic Hydrothermal Processing Conditions

In various embodiments, catalytic hydrothermal processing can be performed in a batch, semi-batch, and/or continuous type processing environment(s). Regardless of whether the reaction takes place in a batch, semi-batch, or continuous reaction system, any system region where the biomass is treated under hydrothermal treatment conditions can be referred to as the reaction zone. The reaction zone can correspond to a reactor for a batch or semi-batch environment and/or to a reactor, conduit, or other location for hydrothermal treatment in a continuous reaction system.

In embodiments involving a batch reactor, the reactor can be any type of batch reactor suitable for handling the processing conditions. Due to the potential presence of water at supercritical conditions, stainless steel can be a suitable non-reactive material for the reactor walls. Other materials and/or coatings for the reactor surfaces can be used that are compatible with the reaction conditions described herein. Examples of suitable reactors can include, but are not limited to, autoclaves, stirred tanks, plough mixers, and the like, and combinations thereof. Alternately, a bubble column could be used. One possible advantage for batch or semi-batch type processing can occur for algae feeds that have relatively poor flow characteristics. For example, at an algae concentration relative to water of about 20 wt % (i.e., about 4 parts water to 1 part algae by weight), the resulting mixture can have the consistency of a paste. Such a paste could be difficult to move, e.g., using pumps in a continuous flow type reactor.

In one embodiment, a batch reactor can be used for catalytic hydrothermal processing of an algae feed. A portion of algae feed mixed with water can be introduced into the reactor, which can then be purged (if necessary), e.g., to remove any oxygen containing gases. Optionally, a partial pressure of an inert gas and/or a reducing gas can then be introduced into the reactor. Examples of suitable reducing gases can include hydrogen, while suitable inert gases can include nitrogen. Additional or alternate examples of suitable reducing gases can include any gas that does not add molecular oxygen to the reaction atmosphere, whether prior to the start of the reaction or from dissociation forming oxygen during the hydrothermal processing. The partial pressure of additional gas introduced into the reactor, when present, can be at least about 1 bar (about 0.1 MPa), for example at least about 25 bar (about 2.5 MPa), at least about 40 bar (about 4.0 MPa), or at least about 50 bar (about 5.0 MPa). Additionally or alternately, the partial pressure of gas introduced into the reactor, when present, can be about 100 bar (about 10 MPa) or less, for example about 75 bar (about 7.5 MPa) or less or about 50 bar (about 5.0 MPa) or less. Note that introducing a reducing gas can correspond to at least partially dissolving a reducing gas in the water (e.g., saturating the water) for the hydrothermal treatment.

After introducing the algae, water, catalyst, and any additional reducing and/or inert gases, the batch reactor can be sealed. The temperature of the reactor can then be raised to at least about 50° C., for example at least about 80° C., at least about 100° C., at least about 150° C., at least about 200° C., at least about 250° C., at least about 275° C., or at least about 300° C. Additionally or alternately, the temperature of the reactor can be raised to about 500° C. or less, for example about 400° C. or less, about 380° C. or less, about 350° C. or less, about 300° C. or less, or about 275° C. or less. Further additionally or alternately, the pressure in the reactor can be at least about 1 barg (about 0.1 MPag), for example at least about 4.5 barg (about 450 kPag), at least about 25 barg (about 2.5 MPag), at least about 40 barg (about 4.0 MPag), at least about 50 barg (about 5.0 MPag), or at least about 100 barg (about 10 MPag). Additionally or alternately, the partial pressure of gas introduced into the reactor, when present, can be about 300 barg (about 30 MPag) or less, for example about 250 barg (about 25 MPag) or less, about 225 barg (about 22.5 MPag) or less, or about 200 barg (about 20 MPag) or less.

In some embodiments, the combination of pressure and temperature within the reactor can be selected so that the water in the reactor substantially does not undergo a phase change (e.g., completely does not undergo a phase change). In a phase diagram for water, the critical point is located at a temperature of about 374° C. and a pressure of about 22 MPa. At temperature and pressure combinations beyond this point in the phase diagram, water does not experience a phase transition between a liquid phase and a gaseous phase. Instead, beyond the critical point, water behaves as a single fluid phase. Thus, in some embodiments, the combination of pressure and temperature can be selected so that the liquid water in the reactor remains the stable phase until conditions beyond the critical point are achieved. One way of satisfying this condition can be to select reaction temperatures and pressures that are less than the critical point and thus that do not lead to a phase transition. Note that in some embodiments, a partial pressure of additional gas can be introduced into the reactor (in which case, some minimal amount of water may become vapor, but this situation is contemplated in the invention not to be a "substantial" phase change). If the partial pressure of additional gas is greater than about 22 MPa, then the pressure is already beyond the critical point for water and substantially no phase transition is possible. Note also that, in a closed reactor, e.g., which can have a partial pressure of another gas, substantial phase transitions of water are not likely to occur, so long as the volume of liquid water is sufficient relative to the volume of the reactor.

Additionally or alternately, the pressure within a reactor can be set by selecting a temperature for the water. In some embodiments, the reactor can be sealed or closed after introduction of water and any additional gases, if present. A partial pressure of water vapor should develop in the reactor to correspond to the temperature of the water in the reactor. As the temperature of the reactor increases, a corresponding higher partial pressure of water should develop in the reactor. The hydrothermal processing can be performed at a pressure that represents the combination of the partial pressure of water at the reaction temperature and the partial pressure of any additional inert and/or reducing gases, as well as the partial pressure of any gases generated or evolved during processing. Examples of water partial pressures at various temperatures can include about 0.01 MPa at about 50° C.; about 0.05 MPa at about 80° C.; about 0.1 MPa at about 100° C.; about 0.5 MPa at about 150° C.; about 1.6 MPa at about 200° C.; about 4.0 MPa at about 250° C.; about 5.9 MPa at about 275° C.; about 8.6 MPa at about 300° C.; about 16.5 MPa at about 350° C.; and about 22.1 MPa at about 374° C. Because about 22.1 MPa and about 374° C. corresponds to the critical point in the phase diagram for water, it is not meaningful to refer to the partial pressure of "water vapor" in a reactor at temperatures beyond that point.

In some embodiments, the hydrothermal processing can be performed in a continuous flow type reactor. An example of a continuous flow type reactor can be a pipe or other conduit that can be heated to raise the temperature of the feed in the conduit to the desired hydrothermal processing temperature. For example, a conduit passing through a furnace could be used, and/or a conduit surrounded by steam. The conduit can have any convenient shape for passing through the heating zone. For example, a conduit having the shape of a spiral can be used to increase the size of the portion of the conduit within the heating zone.

It has been noted that the amount of water needed in order to perform hydrothermal processing may not be sufficient to provide the type of flow characteristics desired for a continuous flow environment. In a continuous flow processing environment, one option for improving the fluid flow characteristics of the algae can be to increase the water content of the algae feed. However, increasing the water content can also result in a corresponding decrease in the yield per volume of the reaction system, due to the reduction in the amount of algae in the feed.

Other types of continuous flow reactors can potentially be used for hydrothermal treatment of an algae feed, such as a fixed bed reactor, a moving bed, an ebullating bed reactor, or the like. If a fixed bed reactor is used, one concern could be fouling of the catalyst bed, e.g., due to solids present in the biomass or algae feed. Fouling of a catalyst bed can result in a higher than expected pressure drop across a catalyst bed, due to restrictions in flow of feed through the bed. Fixed bed reactors can often handle feeds with particle sizes up to about 150 µm without significant fouling issues. Nevertheless, any fouling of a catalyst bed can be somewhat mitigated, e.g., by having bypass tubes to control the pressure drop across the catalyst bed. Unfortunately, although individual algae cells have small diameters, relative to 150 µm, hydrothermally treated algae can have an increased tendency to agglomerate. As a result, 5% or more of the algae based solids resulting from hydrothermal treatment of an algae feed can be in the form of agglomerated particles with a particle size greater than 150 µm. Nevertheless, in some embodiments, a fixed bed reactor may be used, particularly when agglomerative behavior of the product algae solids can be mitigated, e.g., by using a sufficient space velocity and/or through other means.

As an alternative to a fixed bed reactor, an ebullating bed reactor can be used for hydrothermal processing. In a conventional ebullating bed reactor, both the feedstock (water and algae) and a treat gas (hydrogen-containing reducing gas) can be introduced into the reactor from the bottom of the reactor. In such reactors, a recycled feed containing a portion of the reactor effluent can also be introduced into the bottom of the reactor. These feed flows can travel up into the reactor and pass through a catalyst support grid designed to prevent catalyst from entering the areas at the bottom of the reactor where the feed pumps are located. The catalyst in such ebullating bed reactors is typically located above the catalyst support grid.

When the feedstock (and optionally additional gas) flow(s) reach the catalyst bed, the bed generally becomes fluidized, leading to expansion of the bed as well as mixing within the bed. The feed (and hydrogen) can react within the bed to form products, including liquid products, solid products, and gaseous products. The flow in a conventional ebullating bed reactor can continue upward until an effluent is drawn off at the top. This effluent can be a combination of desired products, unreacted hydrogen (when present), and byproduct gases, including contaminant gases such as $H_2S$ or $NH_3$ that may have formed during the reaction. In preferred embodiments, a portion of the liquid effluent can be recycled, e.g., to the bottom of the reactor. If desired, the gases can be separated from the liquid portion of the effluent.

FIG. 1 schematically shows an example of a reactor suitable for use in an embodiment of the invention. In FIG. 1, hydrothermal processing reactor 100 can represent any type of reactor suitable for performing a catalytic hydrothermal process for treatment of an algae (or other biomass) feed. Input flows into reactor 100 can include a gas input 102, such as an inert gas input, a hydrogen gas input, another type of reducing gas input, or a combination thereof. Another input flow can be an algae or biomass input 104. If algae input 104 has poor flow properties, such as due to a sufficiently low water content, algae input 104 may alternately represent a non-flow input, such as extrusion, pouring, or dumping of the algae input 104 into reactor 100. Optionally, a supplemental input flow 105 can be provided for various reasons. One option for a supplemental input flow 105 can be to include additional water, so that hydrothermal processing conditions can be maintained. An additional or alternate component for supplemental input flow 105 can be an "inert" hydrocarbon stream (that can undergo minimal reaction under hydrothermal processing conditions) and/or a product recycle stream. Such a hydrocarbon stream and/or recycle stream could be used as a carrier for a catalyst or a catalyst precursor. As an alternative, algae input 104 and supplemental input 105 can be combined into a single stream prior to entering the reactor 100. The hydrothermal treatment can generate an output flow 107, e.g., which can be a mixture of various phases. Phases that can comprise output flow 107 can include a gas phase, a hydrocarbon based phase, an aqueous based phase, and one or more solid phases. These phases may optionally be mixed with each other, such as mixing of the solids with the aqueous phase.

Separation of Products from Catalytic Hydrothermal Processing

Hydrothermal processing can result in a multi-phase product. The multi-phase product can include a gas phase, a hydrocarbon or oil phase, and an aqueous phase that can include solids. The gas phase, oil phase, aqueous phase, and solids phase can be separated from each other by any convenient method, such as by use of a three phase separator. Characterization of the oil phase is described further below. In some embodiments, the solids phase can initially be together with aqueous phase. For example, the solids phase can be suspended in the aqueous phase or can be a precipitate slurried in and/or settling out of the aqueous phase. The solids phase can also be valuable, containing one or more of: phosphorus and other potential nutrients for algae and/or other microorganisms; unreacted and/or only partially reacted biomass; and catalyst particles; inter alia. In some embodiments, the catalyst particles can be separated from the other solids to allow for their recycle, as well as for recycle of the nutrients, if present.

Figure 2:
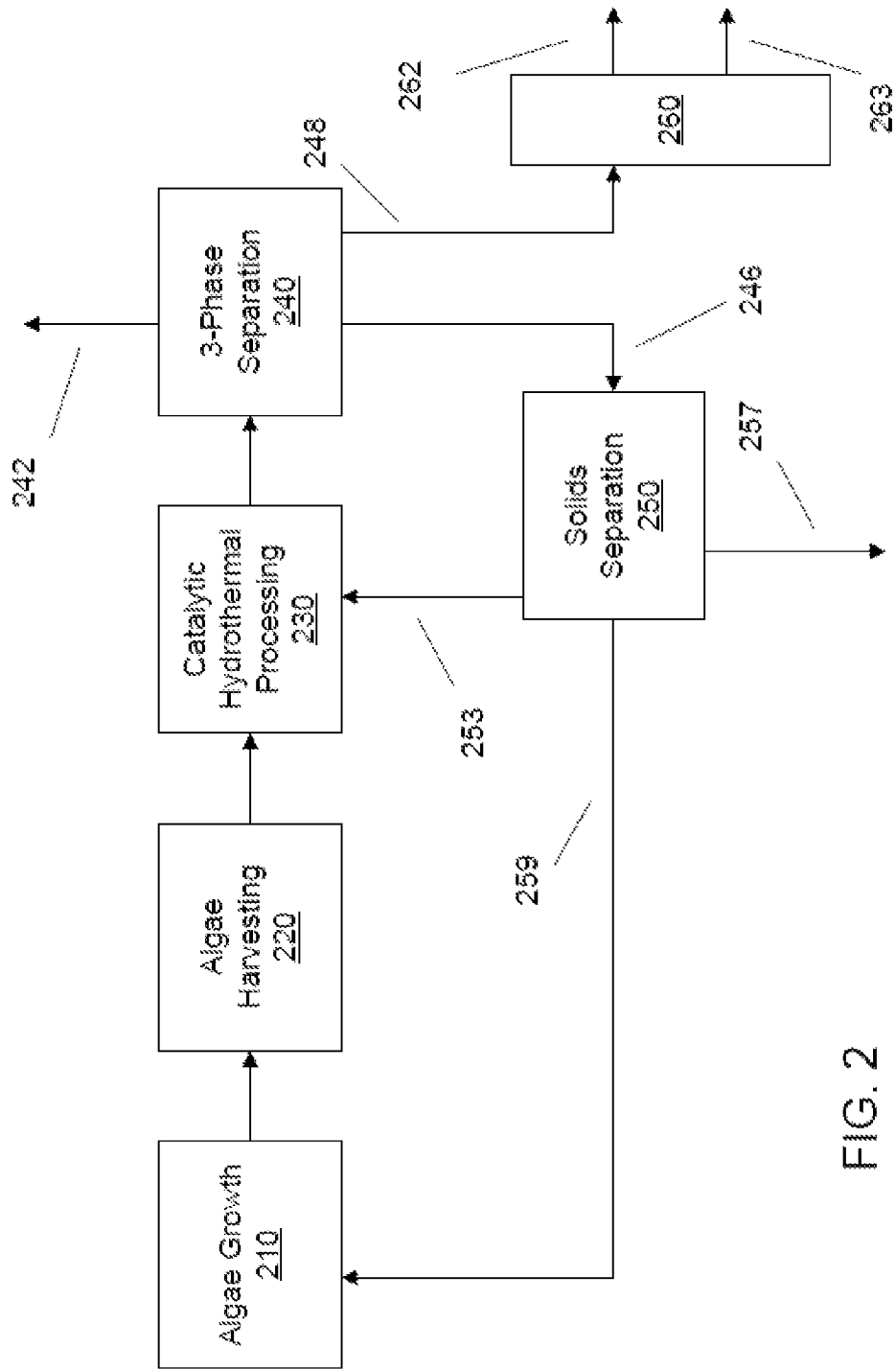
FIG. 2 schematically shows a reaction scheme according to an embodiment of the invention.

FIG. 2 shows a schematic example of a processing flow for an embodiment of the invention involving algae as the form of biomass for processing. In FIG. 2, an integrated scheme is shown where products from the catalytic hydrothermal processing are recycled for further use. In FIG. 2, the biomass input for the hydrothermal processing can be from an algae source. This algae can be produced by an algae growth process 210, which can include any convenient and/or known process. The algae can be harvested 220 for conversion into hydrocarbon products. As part of algae harvesting 220, some amount of water can optionally be removed from the algae. For example, water can be completely removed from the algae as part of production of freeze-dried algae. Alternately, water can be removed using only physical processes, such as by centrifuge, which can advantageously result in an algae feed with a water to algae weight ratio of about 10:1 or less, for example about 7.5:1 or less, or about 5:1 or less. Additionally or alternately, the water to algae weight ratio can be at least about 2:1, for example at least about 2.5:1, or at least about 3:1. One advantage of performing only a partial separation of algae and water can be that less energy is needed to perform only a partial separation, as compared to complete separation.

After harvesting, the harvested algae can be used as a feed for hydrothermal processing 230. The algae feed can be optionally combined with a catalyst, a partial pressure of gas such as hydrogen, and optionally water, e.g., if sufficient water is not included with the algae feed. The hydrothermal processing 230 can generate a variety of products. An initial separation of these products can be performed in three-phase separator 240. Three-phase separator 240 can be used to generate a gas phase product 242, a hydrocarbon or oil product 248, and a product including water and various solids 246. The gas phase product 242 can include hydrogen, inert gases that may have been present during hydrothermal processing 230, product gases from the hydrothermal processing 230 (such as $CO_2$, CO, $H_2S$, $NH_3$, and the like, and combinations thereof), and low boiling hydrocarbons produced during catalytic hydrothermal processing 230. The low boiling hydrocarbons can include hydrocarbons that are gases at room temperature (such as methane, ethane, or the like, or combinations thereof) and/or hydrocarbons that are gases at the temperature of the three-phase separation. If the three-phase separation is performed at an elevated temperature, this could include higher boiling aliphatic hydrocarbons and/or other species (such as methanol). Note that some of the above products may be at least partially solublized in the water phase, such as the product gases from the hydrothermal processing.

In the products from hydrothermal processing 230, the desired hydrocarbon or oil product can form a phase separate from an aqueous phase containing various solids. These distinct phases can be separated in three-phase separation 240. The resulting hydrocarbon product 248 can represent the desired oil product from the catalytic hydrothermal treatment. The hydrocarbon product 248 may, if desired, undergo a variety of additional processing, which can include an optional distillation 260 to isolate desired boiling ranges 262 and 263 of the product and/or hydroprocessing to upgrade the hydrocarbon product 248 or a distillation cut 262 or 263 for use. Additionally or alternately, at least a portion of hydrocarbon product 248 and/or of distillation cut(s) 262 and/or 263 may optionally be recycled to hydrothermal processing 230, e.g., for combination with the algae/water input feed, which may improve the input feed flow characteristics.

In some embodiments, the water and solids 246 from the three-phase separation 240 can include several types of solids, which can include but are not limited to solids derived from the algae, solids comprising phosphorus and/or various metals, unreacted and/or partially reacted biomass, and catalyst particles. The water and solids 246 can be further processed in solids separation 250 to separate the solids for further use. Solids separation 250 can generate an aqueous stream 257, catalyst particles 253, and algae-derived solids 259. Note that separation of the catalyst particles from the algae-derived solids may occur prior to separation of the aqueous phase from the solids. In a preferred embodiment, the catalyst particles 253 can be returned to the catalytic hydrothermal processing for further use. Additionally or alternately, the algae-derived solids 259 can be returned to the algae growth process 210, e.g., as raw material for developing a new batch of algae feed. Further additionally or alternately, at least a portion of aqueous stream 257 and/or of the water from water and solids 246 can be recycled to the algae growth process 210, e.g., to provide additional nutrients such as nitrogen-containing species (like $NH_3$).

Although the scheme in FIG. 2 implies a series of processes located together, the algae growth 210 and harvesting 220 could take place at a location remote from the catalytic hydrothermal processing 230. In such an embodiment, several of the arrows in FIG. 2 could represent transport steps, such as transport of the harvested algae to the location for catalytic hydrothermal processing and/or transport of the algae-derived solids to the algae growth site.

Phosphorus Content in Solids Fraction

Additionally or alternately to recovery of a hydrocarbon product, recovery of other algae solids (or other biomass solids) can be beneficial. For example, phosphorus can be recovered from the residual algae solids after hydrothermal treatment. One potential use for recovered phosphorus can be as a nutrient for growth of additional algae or other biomass.

Improving the recovery of phosphorus from hydrothermal processing of biomass can involve balancing several factors. One benefit of various embodiments can be that phosphorus forms a solid product, e.g., that can be filtered out from the liquid product streams. Any phosphorus that remains as part of the liquid hydrocarbon product and/or any phosphorus that becomes solublized in a solvent could be recovered in one or more separate, additional processes. In the discussion below, the recovery of phosphorus from products of hydrothermal treatment can be evaluated based on the amount of phosphorus recovered as solids.

Because the recovery of phosphorus can be evaluated based on the amount of phosphorus in the solids product, an initial goal can be to develop processing conditions that result in a large percentage of phosphorus in the solids product. One conventional way of processing a biomass feed, such as an algae feed, can be to extract a desired hydrocarbon product from the feed using an extraction solvent (e.g., such as a mixture of $CHCl_3$ and $CH_3OH$). An extraction solvent can advantageously produce yields of phosphorus in the solids product of greater than 90 wt % relative to the amount of phosphorus in the feed. For an efficient phosphorus recovery process, it can be desirable to have a phosphorus yield in the solids product, relative to the feed phosphorus content, of at least 80 wt %, for example at least 85 wt % or at least 90 wt %.

One option for improving the yield of phosphorus in the solids product can be to increase the amount multivalent cations in the hydrothermal reaction. Many biomass feeds can contain at least some multivalent cations, such as Ca, Mg, and/or Fe. These multivalent cations can form phosphates or other phosphorus solids as part of the solids product. For some feeds, increasing the amount of available multivalent cations may increase the amount of phosphorus in the solids product, such as by adding extra cations selected from Ca, Mg, Fe, Al, or a combination thereof. In some such embodiments, sufficient multivalent cations can be added to provide at least about a 1:1 molar ratio of multivalent cations to phosphorus atoms. This can correspond to adding at least about 0.1 wt %, for example at least about 0.2 wt % or at least about 0.3 wt % of a multivalent metal. Additionally or alternately, the amount of added multivalent metal can be about 1.0 wt % or less, for example about 0.8 wt % or less, about 0.6 wt % or less, or about 0.5 wt % or less. Note that the amount of multivalent metal can be reduced in a feed that already contains some multivalent metal.

Another consideration in selecting conditions for hydrothermal processing can be the relative amount of phosphorus in the solids product. As noted above, solvent extraction can produce a solids product that has greater than 90 wt % of the initial phosphorus in the feed. Unfortunately, such conventional solvent processing can also result in a relatively large amount of carbonaceous solids, e.g., in which product phosphorus can be present in amounts as low as 5 wt % or below. This can present a number of problems. First, additional processing can be required to extract the phosphorus from the much larger proportion of carbon solids and/or other solids. Another problem can be that relatively high carbon content in the solids product can increase the difficulty of using/selling the solids for an economically valuable purpose. Another concern can be that a large proportion of carbon in the solids product can mean that a noticeable amount of carbon may be lost, rather than being converted into a desired product.

The amount of phosphorus recovered in the solids product relative to carbon can depend in part on the reaction conditions. Without being bound by any particular theory, it is believed that relatively low severity reaction conditions can lead to incomplete reaction of the biomass feed. This can result in algae (or other biomass) solids that are unreacted and/or only partially reacted. The algae is initially solid, so unreacted and/or partially reacted algae can still be a solid after an incomplete reaction. The unreacted and/or partially reacted algae can thus add to the carbon content of the solids product, which can therefore reduce the ratio of phosphorus to carbon. It is noted that incomplete reaction may additionally or alternately lead to a reduction in the amount of phosphorus in the solids relative to the initial amount of phosphorus.

Also without being bound by theory, it is believed that reaction conditions that are too severe may lead to increased carbon in the solids product. Hydrothermal processing of biomass feeds can lead to increased production of some heavier molecules, including aromatics. A portion of these heavier molecules can correspond to insoluble compounds that tend to form solids. These additional solids can thus contribute to lowering the ratio of phosphorus to carbon in the solids products.

In some embodiments, the hydrothermal processing temperature can be selected to improve the ratio of phosphorus to carbon in the solids product. For example, the reaction temperature can, in on embodiment, range from about 275° C. to about 325° C. Additionally or alternately in catalytic hydrothermal processing embodiments, the presence of catalyst can reduce the processing temperature that leads to an increase in the ratio of phosphorus to carbon in the solids product. In such embodiments, the reaction temperature can range from about 250° C. to about 300° C.

Further additionally or alternately, improving the ratio of phosphorus to carbon in the solids product for catalytic hydrothermal processing can be based on a combination of processing temperature and reaction time. For example, for a processing time from about 60 minutes to about 105 minutes, the reaction temperature can be from about 225° C. to about 275° C.; for a processing time from about 45 minutes to about 90 minutes, the reaction temperature can be from about 250° C. to about 300° C.; for a processing time from about 30 minutes to about 60 minutes, the reaction temperature can be from about 275° C. to about 325° C.; for a processing time from about 24 minutes to about 48 minutes, the reaction temperature can be from about 285° C. to about 335° C.; for a processing time from about 15 minutes to about 30 minutes, the reaction temperature can be from about 300° C. to about 350° C.; and for a processing time from about 6 minutes to about 24 minutes, the reaction temperature can be from about 325° C. to about 375° C. It is noted that, in a continuous reaction environment, a reaction time can more accurately be described in terms of a residence time or a space velocity.

Evaluation of Products from Catalytic Hydrothermal Processing

Catalytic hydrothermal processing can be used to extract various hydrocarbon fractions from an algae (or other biomass) feed. One example of a hydrocarbon fraction that can be extracted from an algae feed can include and/or be a distillate fraction. In the discussion below, a distillate fraction refers to a fraction that has a boiling range between about 193° C. and about 360° C., or alternately to a fraction having at least 90 wt % of its boiling range between about 193° C. and about 360° C. (e.g., the T5 could be about 193° C. and the T95 about 360° C., or the T2 could be about 193° C. and the T98 about 360° C., or the like).

One way to evaluate the products of a hydrothermal treatment process, whether catalytic or non-catalytic, can be to consider the hydrocarbon yield from the process. A total yield can be defined for a hydrothermal treatment process based on the weight of hydrocarbon product captured relative to the initial weight of the algae or other biomass. A distillate yield can also be defined for a hydrothermal treatment process. One yield characterization can be the total distillate boiling range yield for a process relative to the starting weight of algae or biomass. Another characterization can be the percentage of distillate produced relative to the total hydrocarbon yield.

An additional or alternate way to evaluate the products of a hydrothermal treatment process can be based on the levels of various impurities in the products. In a non-catalytic hydrothermal treatment process (or in a catalytic hydrothermal process, analyzed on a catalyst-free basis), the hydrocarbon products can tend to incorporate impurities such as nitrogen, oxygen, carbon-carbon double bonds, and aromatic groups. Thus, the percentage of heteroatoms (nitrogen and/or oxygen) in the total hydrocarbon product and/or the distillate product can be of interest. The percentage of carbon-carbon double bonds and aromatic groups can be measured using techniques such as $^{13}$C NMR, and/or other metrics can be used such as the ratio of hydrogen to carbon in the products.

Additional Embodiments

Additionally or alternatively, the present invention can include one or more of the following embodiments.

Embodiment 1

A method for hydrothermally processing biomass, comprising: contacting a biomass feed with water in the presence of catalyst particles and a reducing gas under effective hydrothermal processing conditions to produce a multi-phase product, the catalyst particles comprising at least one metal component disposed on a catalyst support; and separating the multi-phase product to produce at least a gas phase portion, a liquid hydrocarbon product, an aqueous portion, and a solids portion.

Embodiment 2

The method of embodiment 1, wherein the effective hydrothermal processing conditions comprise a temperature from about 150° C. to about 500° C., a pressure from about 4.5 barg (about 450 kPag) to about 300 barg (about 30 MPag), and optionally a partial pressure of hydrogen-containing reducing gas of at least about 2 bar (200 kPa).

Embodiment 3

The method of embodiment 1 or embodiment 2, wherein separating the multi-phase product to produce a solids portion comprises separating the multi-phase product to produce a catalyst portion and a biomass-based solids portion.

Embodiment 4

The method of any one of the previous embodiments, wherein contacting the biomass feed with water under effective hydrothermal processing conditions does not result in a phase change for the water.

Embodiment 5

The method of any one of the previous embodiments, wherein the biomass feed and the water are introduced into the reactor as a mixture of biomass and water and/or wherein the water and the biomass are present in a weight ratio of water to biomass from about 2:1 to about 10:1, or from about 3:1 to about 5:1.

Embodiment 6

The method of any one of the previous embodiments, wherein a weight of the catalyst particles is from about 5 wt % to about 20 wt %, based on weight of the biomass.

Embodiment 7

The method of any one of the previous embodiments, further comprising separating the hydrocarbon liquid product to produce a fraction having at least 90 wt % of its boiling range from about 193° C. to about 360° C.

Embodiment 8

The method of any one of the previous embodiments, wherein the catalyst support comprises titania, zirconia, silica, vanadia, manganese oxide, cerium oxide, activated carbon, magnesium oxide, hydrotalcite, or a combination thereof, wherein the catalyst support is optionally substantially free of alumina, and wherein the at least one metal component optionally comprises Pt, Pd, Rh, Ru, Ir, or a combination thereof.

Embodiment 9

The method of any one of the previous embodiments, wherein the catalyst particle comprises at least one of K, Co, Ni, Mo, and W on a support that comprises titania, zirconia, vanadia, manganese oxide, cerium oxide, or a mixture thereof.

Embodiment 10

The method of any one of the previous embodiments, wherein the biomass feed comprises an algae-based feed.

Embodiment 11

The method of any one of the previous embodiments, further comprising hydroprocessing at least a portion of the liquid hydrocarbon product in the presence of a hydroprocessing catalyst under effective hydroprocessing conditions.

Embodiment 12

The method of embodiment 11, wherein the liquid hydrocarbon product is combined with at least one of a mineral feed and a biocomponent feed prior to hydroprocessing, the biocomponent feed comprising one or more of a vegetable fat or oil, an animal fat or oil, a fish fat or oil, a pyrolysis oil, and an algae oil.

Embodiment 13

The method of embodiment 11 or embodiment 12, wherein the hydroprocessing conditions comprise effective catalytic dewaxing conditions including a total pressure from about 400 psig (about 2.8 MPag) to about 1500 psig (about 10.3 MPag), an LHSV from about 0.5 hr$^{-1}$ to about 5.0 hr$^{-1}$, and a treat gas rate from about 500 scf/bbl (about 85 Nm$^3$/m$^3$) to about 2000 scf/bbl (about 340 Nm$^3$/m$^3$), and/or wherein the hydroprocessing conditions comprise effective hydrotreating conditions including a temperature from about 315° C. to about 425° C., a total pressure from about 300 psig (about 2.1 MPag) to about 3000 psig (about 20.6 MPag), an LHSV from about 0.2 hr$^{-1}$ to about 10 hr$^{-1}$, and a hydrogen treat gas rate of about 500 scf/bbl (84 m$^3$/m$^3$) to about 10000 scf/bbl (1685 m$^3$/m$^3$).

Additionally or alternately, a method according to any one of the previous embodiments can be provided, wherein the biomass feed has a phosphorus content and a phosphorus to carbon ratio, wherein the effective hydrothermal treatment conditions are selected so that the solids portion contains at least about 80%, for example at least about 90%, of the phosphorus content of the biomass feed, and wherein the phosphorus to carbon molar ratio of the solids portion can optionally be at least about 0.25.

Additionally or alternately, a method according to any one of the previous embodiments can be provided, wherein the effective hydrothermal treatment conditions can comprise a temperature from about 250° C. to about 300° C., for example from about 275° C. to about 325° C., from about 300° C. to about 350° C., or from about 325° C. to about 375° C.

Additionally or alternately, a method according to any one of the previous embodiments can be provided, wherein the effective hydrothermal treatment conditions can comprise hydrothermal treatment in the presence of a catalyst, the temperature being from about 250° C. to about 300° C. and the processing time being from about 0.75 hours to about 1.5 hours, or the temperature being from about 275° C. to about 325° C. and the processing time being from about 0.5 to about 1.0 hours, or the temperature being from about 300° C. to about 350° C. and the processing time being from about 0.25 hours to about 0.5 hours.

Additionally or alternately, a method according to any one of the previous embodiments can be provided, wherein the catalyst particles can have an average particle size of at least 1000 µm, or at least 2000 µm, and/or wherein the catalyst particles can have a minimum average particle dimension of at least 1000 µm, or at least 2000 µm.

Example of Catalytic Hydrothermal Treatment

A series of experiments were performed to test various types of hydrothermal treatment of an algae feed. In the experiments, samples of algae feed were placed in 316SS stainless steel 1 inch outer diameter reactors (Swagelok cap and plug). The reactor was placed into a pre-heated ebullated sandbath. The reactors remained in the sandbath for about 60 minutes. At the end of the time period, the reactors were removed from the sandbath and quenched to room temperature. The hydrocarbon products were recovered using methylene chloride extraction and phase separation.

A commercially available sample of freeze-dried Nannochloropsis algae was used for the experiments. The algae were mixed with water to yield a water to algae weight ratio of about 4:1. For experiments involving a catalyst, the amount of catalyst added to the reactor was about 10% by weight, relative to the weight of the dried algae. In experiments without a catalyst, a nitrogen partial pressure of about 3 bar (about 0.3 MPa) was added to the reactor. In experiments with a catalyst, a partial pressure of about 50 bar (about 5.0 MPa) of hydrogen was added to the reactor. In the experiments described below, the temperature of the sandbath (and therefore the reactor) was either about 300° C. or about 350° C.

Table 1 shows examples of hydrothermal processing of algae samples at a series of reaction conditions. As shown in Table 1, hydrothermal processing was performed without a catalyst, with catalysts of Pt supported on activated carbon (about 10 wt % Pt), with catalysts of Pd supported on activated carbon (about 10 wt % Pd), an activated carbon catalyst, and Pt supported on niobic acid (about 10 wt % Pt).

TABLE 1

| Catalyst | Total Yield | Std Dev | % distillate | % increase | Distillate Yield | % increase |
|---|---|---|---|---|---|---|
| None (350° C.) | 39.6 | | 44.4 | | 17.6 | |
| Pt/C (350° C.) | 31.5 | 2.1 | 53.8 | 21.2 | 16.9 | −4.0 |
| Carbon (350° C.) | 35.0 | | 48.5 | 9.2 | 13.5 | −23.3 |
| Pt/niobic acid (350° C.) | 31.9 | 0.1 | 53.7 | 20.9 | 17.1 | −2.8 |
| None (300° C.) | 44.4 | | 49.2 | | 21.9 | |
| Pt/C (300° C.) | 27.3 | 3.0 | 56.4 | 14.6 | 15.4 | −29.7 |

As shown in Table 1, performing hydrothermal processing in the presence of a catalyst had several impacts on the products. The overall yield of hydrocarbon product was reduced, but the percentage of distillate product in the overall yield was increased. The net effect was that the total distillate yield was also decreased, although this decrease was small for the catalysts including Pt at about 350° C.

Figure 4A:
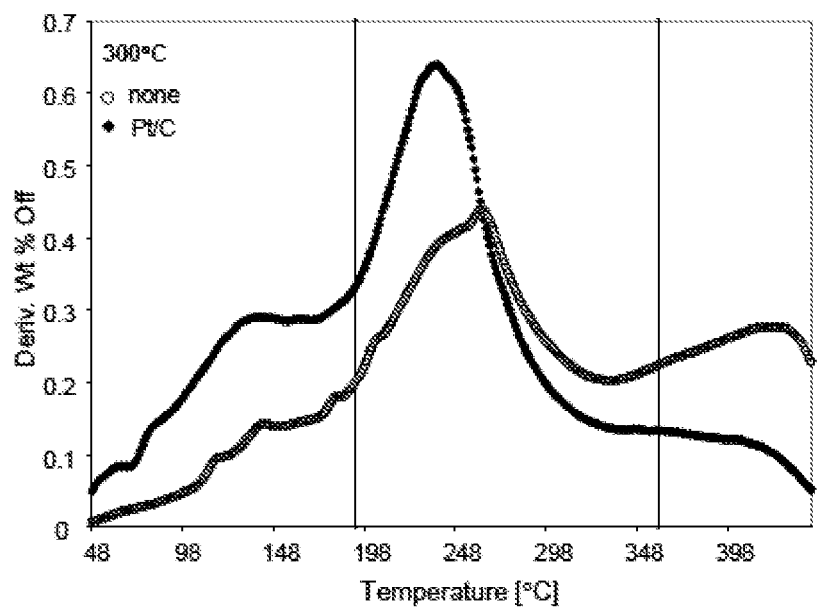
FIGS. 4a and 4b show distillation profiles for hydrocarbon products from hydrothermal treatment.
Figure 4B:
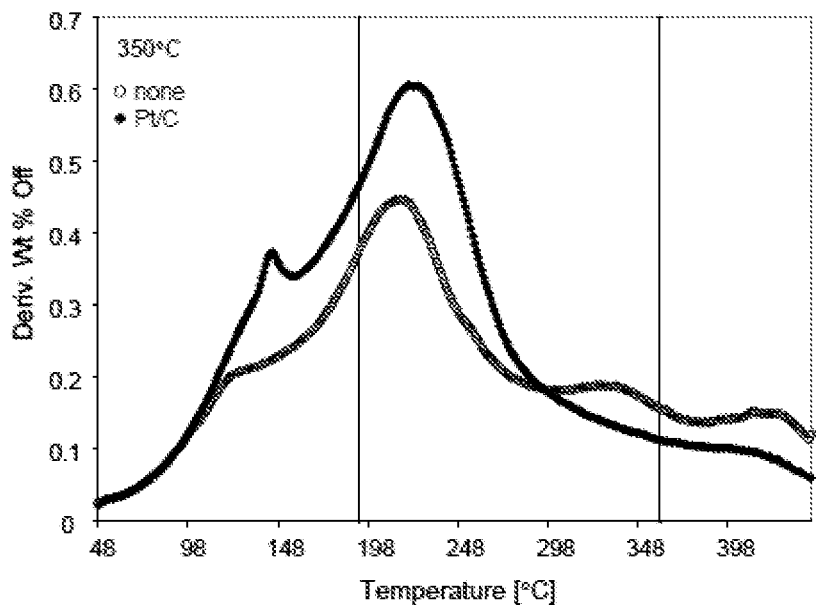

FIGS. 4a and 4b show an example of how the yield profile changes for processing with no catalyst versus processing in the presence of the catalyst with about 10 wt % Pt supported on carbon. FIGS. 4a and 4b provide the derivative of a thermogravimetric analysis (TGA) profile at both about 300° C. (FIG. 4a) and about 350° C. (FIG. 4b) for the no catalyst and Pt/carbon catalyst runs shown in Table 1. In the plots shown in FIGS. 4a and 4b, it was assumed that the mass loss was due to boiling as opposed to decomposition. As shown in FIGS. 4a and 4b, the catalytic hydrothermal processing produced an increased amount of hydrocarbon products both below about 193° C. and between about 193° C. and about 360° C. The increase in the amount of lower boiling products was more pronounced at a processing temperature of about 300° C.

In addition to modifying the overall yield, performing the hydrothermal processing in the presence of a catalyst also modifies the impurities within the hydrocarbon product. Table 2 shows results from $^{13}$C NMR characterization of the hydrocarbon products for processing at about 350° C. with various catalysts. In Table 2, "HT" refers to hydrotalcite. For the experiment using both Pd supported on carbon and hydrotalcite, 10% by weight of each catalyst, based on the weight of the algae, was included in the reactor.

TABLE 2

| Catalyst | Yield Oil (%) | $^{13}$C NMR C=O | $^{13}$C NMR Aromatics/Olefins | $^{13}$C NMR Aliphatics |
|---|---|---|---|---|
| None | 39.6 | 8.3 | 37.7 | 54 |
| Pd/C and HT (10 wt % each) | 43.3 | 5.5 | 25.0 | 70.0 |
| Carbon | 35.0 | 7.8 | 21.6 | 70.6 |
| Pt/C | 31.5 | 1.3 | 28.0 | 70.7 |
| Pt/niobic acid | 31.9 | 6.8 | 26.9 | 70.6 |

Based on the data in Table 2, all of the catalysts were effective for reducing the total level of impurities in the hydrocarbon products produced by hydrothermal processing of algae. The Pt on carbon catalyst was the most effective for reducing the percentage of oxygen containing species in the hydrocarbon products. The carbon catalyst was most effective for reducing the percentage of aromatics and olefins in the hydrocarbon products. All of the catalysts tested provided similar results for increasing the amount of aliphatics in the hydrocarbon products. The data in Table 2 may also indicate that increasing the relative amount of catalyst in a reactor can improve the hydrocarbon products. Using 10% by weight of both a Pd on carbon catalyst and a hydrotalcite catalyst resulted in both an increased hydrocarbon yield and a reduced level of impurities in the hydrocarbon products. Based on the data in Table 2, another useful catalyst combination may be a supported Pt on carbon catalyst in combination with a hydrotalcite or another type of catalyst, such as one containing magnesium oxide.

Use of a catalyst in the presence of a hydrogen-containing atmosphere can also increase the amount of hydrogen present in the resulting oil product. Table 3 shows the hydrogen to carbon ratio and nitrogen content of the hydrocarbon products from several experiments.

TABLE 3

| Catalyst | Yield Oil (wt %) | H/C (molar ratio) | N (wt %) |
|---|---|---|---|
| None | 39.6 | 1.4 | 5.5 |
| Pd/C and HT (10 wt % each) | 43.3 | 1.7 | 3.5 |
| HT | 33.8 | 1.6 | 5.7 |
| Carbon | 35.0 | 1.6 | 4.7 |
| Pt/C | 31.5 | 1.8 | 4.6 |

As shown in Table 3, hydrothermal processing in the presence of a catalyst and an atmosphere containing hydrogen led to an increase in the hydrogen to carbon ratio for the resulting hydrocarbon products. The increase in the hydrogen to carbon molar ratio was consistent with the data from Table 2, which showed increases in aliphatic carbon species and decreases in compounds with double bonds or aromatic rings. The catalysts with carbon, Pt on carbon, and the combination of Pd on carbon with hydrotalcite also showed reduction in the amount of nitrogen contained within the hydrocarbon products. This was beneficial, as such results indicated a reduced amount of, or necessity for, additional processing needed to make a suitable diesel or lubricant product.

Processing of Product Solids for Recycle of Nutrients

As noted above, some of the product solids can be recycled for use as nutrients for growth of further algae or other biomass. An example of this type of recycle can be recycling of phosphorus compounds. In order to recycle the phosphorus, the phosphorus can be converted from the solid form into a precursor form that can be readily processed into a suitable nutrient. An example of this type of conversion can be conversion of phosphorus in the product solids into a more easily distributable form, such as phosphoric acid. The phosphoric acid can then be used either as a nutrient, or as a precursor or reagent to make a suitable nutrient.

Phosphorus can be contained in the product solids in a variety of forms, such as phosphates and/or phosphites, and may be coordinated by Ca, Mg, or other multivalent cations. The solids can also contain carbon compounds. In order to separate the phosphorus from the carbon, the phosphorus in the solids can, in one embodiment, be converted to phosphoric acid. Conversion of phosphorus to phosphoric acid is a known reaction, and can be performed by treating the phosphorus containing solids with sulfuric acid. The sulfuric acid can react with the phosphorus to form phosphoric acid. The sulfate ions from the sulfuric acid can combine with Ca or Mg cations and precipitate out. In such situations, the carbon may remain as additional solid product. The sulfate solids and carbon can be separated from the phosphoric acid by physical and/or known/conventional means, e.g., using filtration or a settling pond.

Examples of Phosphorus Recovery

A series of experiments were performed to test phosphorus recovery from conventional solvent processing of an algae feed and from hydrothermal treatment of an algae feed. A commercially available freeze-dried *Nannochloropsis* algae sample was used for the experiments.

For the solvent processing, the solvent was a 50:50 mixture on a volume basis of $CHCl_3$ and $CH_3OH$. One part of the freeze-dried Nannochloropsis algae was combined with five parts of the $CHCl_3/CH_3OH$ solvent and vigorously stirred for about 24 hours at room temperature (i.e., about 20-25° C.). Two distinct phases were apparent, a first phase containing the solvent and a solublized product, and a second phase containing solid remnants suspended in and/or settled to the bottom of the solvent. The solids remnants were isolated and analyzed; the results of these characterizations are shown in Table 4 below.

For the hydrothermal treatment experiments, samples of the freeze-dried algae were mixed with water in a ratio of about four parts water to one part algae. The algae and water mixture was placed in 316SS stainless steel ~1-inch outer diameter reactors (Swagelok cap and plug). A nitrogen partial pressure of about 50 bar (about 5.0 MPa) was added to the reactor. A separate catalyst was not added to the reactor. The reactor was placed into a pre-heated ebullated sandbath. The reactors remained in the sandbath for about 60 minutes. Thereafter, the reactors were removed from the sandbath and quenched to approximately room temperature. The hydrocarbon products were recovered using methylene chloride extraction and phase separation. In the experiments described below, the temperature of the sandbath (and therefore the reactor) was about 200° C., about 300° C., or about 350° C.

Table 4 shows examples of processing of algae samples using solvent extraction and at the three hydrothermal processing temperatures. In the table, the term "phosphorus yield" refers to the weight percent of phosphorus from the initial sample that was contained in the solids product. Phosphorus concentration refers to the weight percent of phosphorus in the solids product. The P/C molar ratio refers to the molar ratio of phosphorus to carbon in the solids product. The phosphorus recovery efficiency is a measure of the relative amounts of phosphorus and carbon in the solids product. The phosphorus recovery efficiency is defined as $P_{recov\ eff} = P_{yield} \times [P_{moles}/(P_{moles}+C_{moles})]$.

In Table 4, Column A shows the results from analysis of the product solids from the solvent extraction. Columns B, C, and D show the results from analysis of the solids fraction from the hydrothermal treatments at about 200° C., about 300° C., and about 350° C., respectively.

TABLE 4

| | A (Solvent only) | B (200° C.) | C (300° C.) | D (350° C.) |
|---|---|---|---|---|
| P Yield (%) | 97 | 34 | 91 | 95 |
| P Conc. (wt %) | 1.55 | 2.16 | 30.8 | 21.8 |
| P/C molar ratio | 0.014 | 0.015 | 0.56 | 0.26 |
| P recovery effic. (%) | 1.3 | 0.5 | 32.5 | 19.8 |

As shown in Table 4, solvent extraction resulted in a relatively high phosphorus yield in the solids product of 97%. However, the solids product also included a large amount of other material, as shown by the overall weight percentage of phosphorus (1.55%). A large portion of this additional material was carbon, as shown by the phosphorus to carbon molar ratio (0.014). As a result, the phosphorus recovery efficiency, as defined above, was only 1.3%.

For the hydrothermal processing at about 200° C., the phosphorus yield was lower at about 34%. Because of the low initial recovery, and a relatively low concentration of phosphorus in the solids, the phosphorus recovery efficiency at about 200° C. was less than 1%.

At the higher processing temperatures, the phosphorus recovery efficiency was notably higher. At both ~300° C. and ~350° C., the phosphorus yield was greater than about 90%, indicating a good capture of the initial phosphorus in the solids product. Both the ~300° C. and ~350° C. experiments showed dramatically improved phosphorus recovery efficiencies, relative to the solvent extraction. This was due in part to the lower carbon content of the solids product, as the phosphorus to carbon molar ratio at both ~300° C. and ~350° C. was greater than about 0.25.

Additionally, the experiment at about 300° C. showed an unexpectedly improved result even relative to the experiment at about 350° C. Although the experiment at ~300° C. had a slightly lower phosphorus yield, the amount of carbon and other materials in the solids product was dramatically lower, as shown by the ~30.8 wt % phosphorus concentration and the phosphorus to carbon molar ratio of ~0.56. Without being bound by any particular theory, it is believed that the additional carbon present in the solids product at ~350° C. may be due to excess reaction with the feed. In an embodiment, the additional improved phosphorus recovery efficiency shown here at a ~300° C. processing temperature can be maintained for other feeds and at other reaction conditions by selecting reaction conditions that maintain a phosphorus yield of around 90%, such as a phosphorus yield from about 87% to about 93%.

The solids product generated by the experiment at ~300° C. was also analyzed using X-ray diffraction (XRD). Compounds that could be identified from the XRD spectrum included phosphates and phosphites. Some compounds identified in the scan were $Ca_{18}Mg_2H_2(PO_4)_{14}$; $Ca_{28.8}Fe_{3.2}(PO_4)_{21}O_{0.6}$; $Mg(PO_3)_2$; $Ca_2P_2O_7$; and $CaCO_3$.

Hydroprocessing—Hydrotreating, Dewaxing, and Hydrofinishing

In some embodiments, additional hydroprocessing can optionally be performed after hydrothermal processing. For example, a hydrotreatment process can remove oxygen, sulfur, and/or nitrogen from a feedstock, such as a product generated by hydrothermal processing. A hydrotreatment process can additionally or alternately saturate aromatics and/or olefins. Further additionally or alternately, catalytic dewaxing can be performed on a hydrocarbon fraction, such as one generated by hydrothermal processing, which can improve one or more cold flow properties of the so-treated hydrocarbon fraction. Still further additionally or alternately, hydrofinishing can be performed on a hydrocarbon fraction, such as one generated by hydrothermal processing. Hydrofinishing can be used to (additionally) saturate olefins and/or aromatics in a feed.

A hydrotreatment process can be used to hydrotreat a hydrocarbon fraction from a hydrothermal treatment process, or a mixture of such a hydrocarbon fraction with a mineral feed, a biocomponent feed, or a combination thereof. In an embodiment, a mineral and/or other biocomponent portion of a feed can be hydrotreated separately from a hydrothermally treated portion of a feed. Alternately, a mineral portion and/or biocomponent portion can be mixed together with a hydrothermally treated hydrocarbon fraction for hydrotreatment.

A conventional hydrotreatment catalyst can contain at least one of Group VIB and Group VIII metals on a support such as alumina and/or silica. Examples of such conventional catalysts can include supported NiMo, CoMo, and NiW catalysts. Hydrotreating conditions can, in one embodiment, be selected to be similar to the dewaxing conditions noted herein. Alternately, the hydrotreating conditions can include a temperature from about 315° C. to about 425° C., a total pressure from about 300 psig (about 2.1 MPag) to about 3000 psig (about 20.7 MPag), an LHSV from about 0.2 $hr^{-1}$ to about 10 $hr^{-1}$, and a hydrogen treat gas rate from about 500 scf/bbl (about 85 $Nm^3/m^3$) to about 10000 scf/bbl (about 1700 $Nm^3/m^3$).

During hydrotreatment, the sulfur and nitrogen contents of a feedstock can advantageously be reduced. In an embodiment, one or more hydrotreatment stages can preferably reduce the sulfur content to a suitable level, such as about 100 wppm or less, for example about 50 wppm or less, about 30 wppm or less, about 20 wppm or less, about 15 wppm or less, about 10 wppm or less, about 5 wppm or less, or about 3 wppm or less. Additionally or alternately, with regard to nitrogen, the hydrotreating stage(s) can preferably reduce the nitrogen content of the feed to about 30 wppm or less, for example about 20 wppm or less, about 10 wppm or less, about 5 wppm or less, or about 3 wppm or less.

Hydrotreatment can additionally or alternately be used to deoxygenate a feed. Deoxygenating a feed can avoid problems with catalyst poisoning or deactivation due to the creation of water or carbon oxides during hydroprocessing. Substantially deoxygenating a feed via hydrotreatment can correspond to removing at least 90%, for example at least 95%, at least 97%, at least 98%, or at least 99% of the oxygen present in the biocomponent feedstock. Alternatively, substantially deoxygenating the feedstock can correspond to reducing the oxygenate level of the total feedstock to 0.5 wt % or less, for example 0.1 wt % or less, 0.05 wt % or less, 0.01 wt % or less, or 0.005 wt % or less.

If a hydrotreatment stage is used prior to a dewaxing stage, a separation device can, in some embodiments, be used to separate out impurities prior to passing the hydrotreated feedstock to the dewaxing stage. The separation device can be a separator, a stripper, a fractionator, or other device suitable for separating gas phase products from liquid phase products. For example, a separator stage can be used to remove $H_2S$ and $NH_3$, inter alia, formed during hydrotreatment. Alternately, the entire effluent from the hydrotreatment stage can be cascaded to the dewaxing stage, if desired.

Catalytic dewaxing relates to the removal and/or isomerization of long chain, paraffinic molecules from feeds. Catalytic dewaxing can be accomplished by selective hydrocracking and/or by hydroisomerizing these long chain molecules. Hydrodewaxing catalysts can typically include molecular sieves such as crystalline aluminosilicates (zeolites), silicoaluminophosphates (SAPOs), or the like. In an embodiment, the molecular sieve can comprise a 1-D or 3-D molecular sieve, e.g., a 10-membered ring 1-D molecular sieve. Examples of suitable molecular sieves for hydrodewaxing can include, but are not limited to, ZSM-48, ZSM-23, ZSM-35, zeolite Beta, zeolite Y, USY, ZSM-5, and combinations thereof, particularly ZSM-48 and/or ZSM-23. Optionally, the dewaxing catalyst can include a binder for the molecular sieve, such as alumina, titania, silica, silica-alumina, zirconia, or a combination thereof, e.g., alumina and/or titania, or silica, zirconia, and/or titania.

One feature of molecular sieves that can impact the activity of the molecular sieve is the ratio of silica to alumina ($Si/Al_2$) in the molecular sieve. In an embodiment, the molecular sieve can have a silica to alumina ratio of about 200:1 or less, for example about 150:1 or less, about 120:1 or less, about 100:1 or less, about 90:1 or less, or about 75:1 or less. Additionally or alternatively, the molecular sieve can have a silica to alumina ratio of at least about 30:1, for example at least about 50:1, or at least about 65:1.

The dewaxing catalyst can typically include a metal hydrogenation component, such as a Group VIII metal. Suitable Group VIII metals can include Pt, Pd, Ni, or the like, or a combination thereof. The dewaxing catalyst can generally include at least about 0.1 wt % of the Group VIII metal, for example at least about 0.3 wt %, at least about 0.5 wt %, at least about 1.0 wt %, at least about 2.5 wt %, or at least about 5.0 wt %. Additionally or alternately, the dewaxing catalyst can include about 10.0 wt % or less of the Group VIII metal, for example about 5.0 wt % or less, about 2.5 wt % or less, or about 1.5 wt % or less.

In some embodiments, the dewaxing catalyst can optionally include a Group VIB metal, such as W and/or Mo, in addition to the Group VIII metal. An example of such an embodiment could be a dewaxing catalyst that includes Ni and W, Ni and Mo, or Ni, Mo, and W. In such an embodiment, the dewaxing catalyst can include at least about 0.5 wt % of the Group VIB metal, for example at least about 1.0 wt %, at least about 2.5 wt %, or at least about 5.0 wt %. Additionally or alternately in such an embodiment, the dewaxing catalyst can include about 20.0 wt % or less of the Group VIB metal, for example about 15.0 wt % or less, about 10.0 wt % or less, about 5.0 wt % or less, or about 1.0 wt % or less. In embodiments where the Group VIII metal is present without a corresponding Group VIB metal, the Group VIII can advantageously include Pt and/or Pd.

Catalytic dewaxing can be performed by exposing a feedstock to a dewaxing catalyst under effective (catalytic) dewaxing conditions. Effective dewaxing conditions can include a temperature of at least about 500° F. (about 260° C.), for example at least about 550° F. (about 288° C.), at least about 600° F. (about 316° C.), or at least about 650° F. (343° C.); additionally or alternately, the temperature can be about 750° F. (about 399° C.) or less, for example about 700° F. (about 371° C.) or less, or about 650° F. (about 343° C.) or less. Effective dewaxing conditions can additionally or alternately include a total pressure of at least about 400 psig (about 2.8 MPag), for example at least about 500 psig (about 3.5 MPag), at least about 750 psig (about 5.2 MPag), or at least about 1000 psig (about 6.9 MPag); additionally or alternately, the pressure can be about 1500 psig (about 10.4 MPag) or less, for example about 1200 psig (about 8.3 MPag) or less, about 1000 psig (about 6.9 MPag) or less, or about 800 psig (about 5.5 MPag) or less. Effective dewaxing conditions can further additionally or alternately include an LHSV of at least about 0.1 $hr^{-1}$, for example at least about 0.5 $hr^{-1}$, at least about 1.0 $hr^{-1}$, or at least about 1.5 $hr^{-1}$; additionally or alternately, the LHSV can be about 10.0 $hr^{-1}$ or less, for example 5.0 $hr^{-1}$ or less, about 3.0 $hr^{-1}$ or less, or about 2.0 $hr^{-1}$ or less. Effective dewaxing conditions can still further additionally or alternately include a treat gas rate can be at least about 500 scf/bbl (about 85 $Nm^3/m^3$), at least about 750 scf/bbl (about 130 $Nm^3/m^3$), or at least about 1000 scf/bbl (about 170 $Nm^3/m^3$); additionally or alternately, the treat gas rate can be about 5000 scf/bbl (about 845 $Nm^3/m^3$) or less, for example about 3000 scf/bbl (about 510 $Nm^3/m^3$) or less, about 2000 scf/bbl (about 340 $Nm^3/m^3$) or less, about 1500 scf/bbl (about 255 $Nm^3/m^3$) or less, or about 1250 scf/bbl (about 210 $Nm^3/m^3$) or less.

A catalytic dewaxing process can modify a feedstock in one or more of several ways. The catalytic dewaxing process can remove oxygen in the biocomponent portion of the feedstock. Olefins in the feedstock can be at least partially saturated (i.e., hydrogenated). The dewaxing process can improve one or more cold flow properties of the feed, such as pour point and/or cloud point. The dewaxing process can remove some sulfur and/or nitrogen from the feedstock. It is noted that prior hydrotreatment of a biocomponent feed can remove substantially all of the oxygen and can saturate olefins. As a result, a dewaxing process performed on a previously hydrotreated feed may perform only limited deoxygenation and/or olefin saturation.

After catalytic hydrotreatment of a feed, or after optional hydrotreating and/or dewaxing, the feed can optionally be hydrofinished. A hydrofinishing stage can be similar to a hydrotreating stage, though generally under somewhat milder conditions than conventional hydrotreating, with a goal of saturating any remaining olefins and/or residual aromatics. A post-dewaxing hydrofinishing can, in some embodiments, be carried out in cascade with the dewaxing step. A hydrofinishing stage can typically operate at a temperature from about 150° C. to about 350° C., for example from about 180° C. to about 250° C., at a total pressure from about 2.8 MPag (about 400 psig) to about 20.7 MPag (about 3000 psig), at a liquid hourly space velocity from about 0.1 $hr^{-1}$ to about 5 $hr^{-1}$, for example from about 0.5 $hr^{-1}$ to about 3 $hr^{-1}$, and at a hydrogen treat gas rate from about 43 $Nm^3/m^3$ (about 250 scf/bbl) to about 1700 $Nm^3/m^3$ (about 10,000 scf/bbl).

Suitable hydrofinishing catalysts can be similar in nature to hydrotreating catalysts. Alternately, an aromatic saturation catalyst can be used in a hydrofinishing step, such as a Group VIII and/or Group VIB metal supported on a bound support from the M41S family, e.g., bound MCM-41. Suitable M41S binders can include, but are not limited to, alumina, silica, or any other binder or combination of binders that provides a high productivity and/or low density catalyst. One example of a suitable aromatic saturation catalyst is Pt and/or another metal on alumina bound mesoporous MCM-41. Such a catalyst can be made, e.g., by impregnating mesoporous MCM-41 (optionally pre-bound) with a hydrogenation metal such as Pt, Pd, another Group VIII metal, a Group VIB metal, or a mixture thereof. In some embodiments, the amount of Group VIII metal can be at least 0.1 wt %, for example at least 0.3 wt %, at least 0.5 wt %, or at least 0.6 wt %, based on catalyst weight; additionally or alternately, the amount of Group VIII metal can be 1.0 wt % or less, for example 0.9 wt % or less, 0.75 wt % or less, or 0.6 wt % or less, based on catalyst weight. Additionally or alternately, the amount of metal(s), either individually or in mixtures, can be at least 0.1 wt %, for example at least 0.3 wt %, at least 0.5 wt %, at least 0.6 wt %, at least 0.75 wt %, or at least 1 wt %, based on catalyst weight; further additionally or alternately, the amount of metal(s), either individually or in mixtures, can be 35 wt % or less, for example 25 wt % or less, 20 wt % or less, 15 wt % or less, 10 wt % or less, or 5 wt % or less, based on catalyst weight.

In one embodiment, the hydrofinishing stage can be performed in the same reactor as the hydrodewaxing, with the same treat gas and at the approximately the same temperature. Additionally or alternately, stripping does not occur in some embodiments between the hydrofinishing and catalytic dewaxing stages.

Integration of Hydrothermal Treatment with Hydroprocessing

Figure 3:
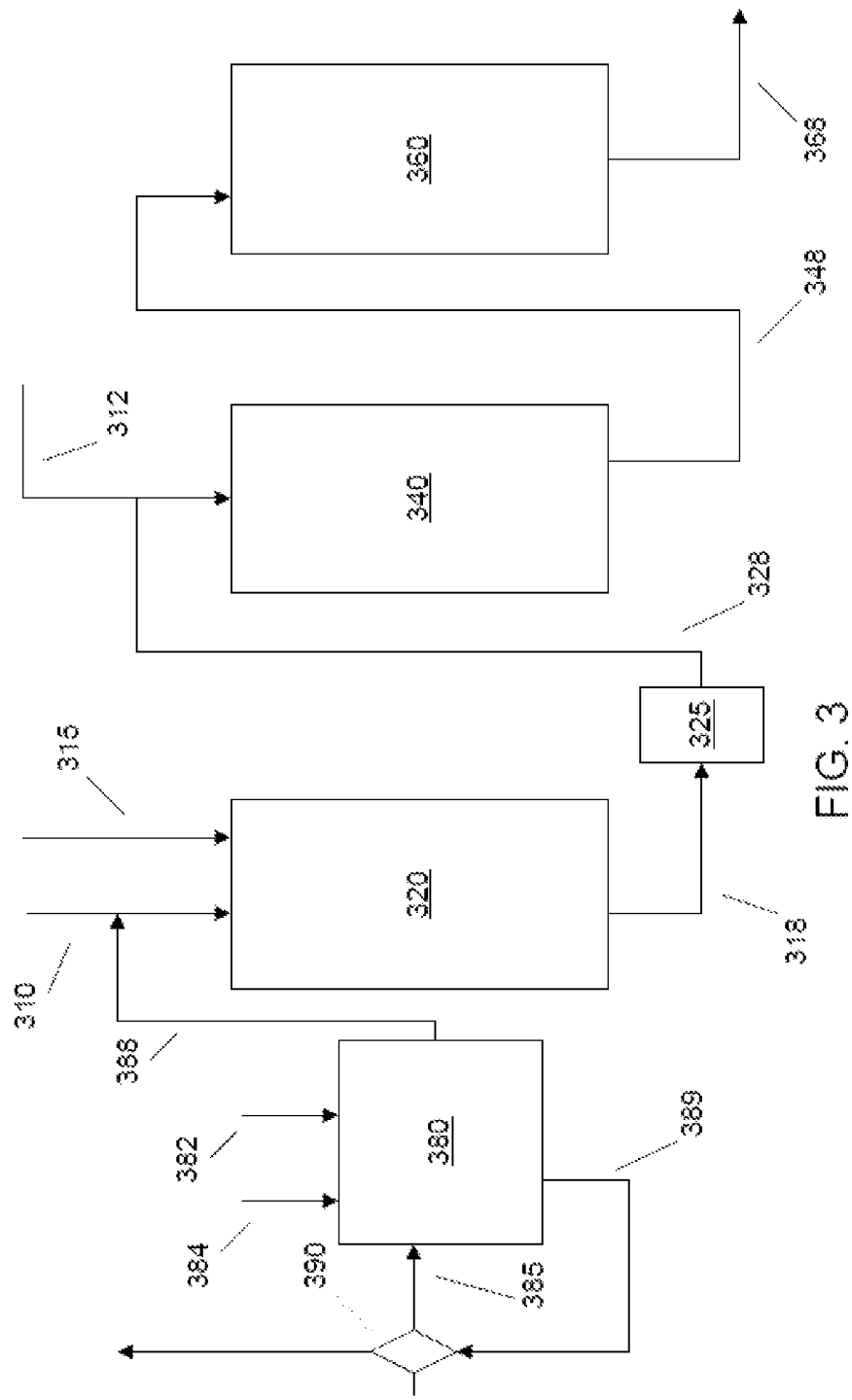
FIG. 3 depicts a reaction system suitable for performing a process according to another embodiment of the invention.

FIG. 3 schematically shows a reaction system for incorporating the hydrocarbon products from catalytic hydrothermal processing into a hydroprocessing reaction.

In FIG. 3, catalytic hydrothermal reactor 380 can represent a reactor and corresponding separation devices for generating separate output streams. Inputs to reactor 380 can include a hydrogen stream 384, an algae stream 382, and an optional water stream 385. Optionally, algae stream 382 and water stream 385 may be combined. FIG. 3 shows that heat exchanger 390 can be used to extract heat from the water effluent 389 from reactor 380 for heating of input stream 385. In some embodiments, other options can be selected for heat integration. For instance, the heat from an output stream from reactor 380 can be used to heat an input stream to reactor 380 and/or an input stream to one of the hydroprocessing stages.

Output 388 can correspond to a separated hydrocarbon fraction from reactor 380. This separated hydrocarbon fraction can optionally represent a distilled portion or cut of the hydrocarbon output of reactor 380, such as a portion having a boiling range from about 193° C. to about 360° C. Output 388 can then be optionally combined with a feedstock 310. The combination of output 388 and feedstock 310 can be prior to entering hydrotreatment reactor 320, or the feeds can be combined in reactor 120. The optional feedstock 310 can represent a mineral feed, a biocomponent feed, or a combination thereof. Note that combining output 388 with feedstock 310 is only one possible choice for combining the output from catalytic hydrothermal treatment with another feed. The product from a catalytic hydrothermal treatment can be combined with another feed either before additional hydroprocessing, in between stages of additional hydroprocessing, or after additional hydroprocessing.

In the embodiment shown in FIG. 3, mineral and/or biocomponent feedstock 310 can be introduced into first hydrotreatment reactor 320 along with the hydrocarbon output 388 from catalytic hydrothermal treatment reactor 380. A hydrogen treat gas stream 315 can also be introduced into hydrotreatment reactor 320. The combined feedstock can be exposed to hydrotreating conditions in first hydrotreatment reactor 320 in the presence of one or more catalyst beds that contain hydrotreating catalyst. Depending on the nature of the combined feedstock, the hydrotreatment can reduce the sulfur content of the treated feedstock to about 50 wppm or less, for example about 30 wppm or less, about 20 wppm or less, about 10 wppm or less, about 5 wppm or less, or about 3 wppm or less. Depending on the nature of the combined feedstock, the hydrotreatment can reduce the nitrogen content of the treated feedstock to about 20 wppm or less, for example about 10 wppm or less, about 5 wppm or less, or about 3 wppm or less. The hydrotreated feedstock 318 can optionally flow from hydrotreatment reactor 310 into a separation device 325, where gas phase products can be separated from liquid phase products. The liquid output 328 from separation device 325 can then be combined with biocomponent feedstock 312.

In an alternate embodiment, hydrotreatment reactor 320 and separation device 325 can be omitted. In such an embodiment, the output 388 and optional mineral and/or biocomponent feedstock 310 can pass directly into conduit 328. Optionally, yet another mineral and/or biocomponent feed 312 can be added at this point.

The hydrotreated feedstock 328 can be combined with optional feedstock 312 prior to entering dewaxing reactor 340. The combined feedstock can be exposed to catalytic dewaxing conditions in the presence of one or more catalyst beds that contain a dewaxing catalyst. The catalytic dewaxing conditions can be sufficient to substantially hydrodeoxygenate the feed.

The effluent 348 from catalytic dewaxing can optionally be hydrofinished in a hydrofinishing stage 360. Depending on the configuration, either effluent 318, effluent 328, effluent 348, or effluent 368 can be considered as a hydroprocessed product for further use and/or processing.

What is claimed is:

1. A method for hydrothermally processing biomass, comprising:
contacting a biomass feed with water in the presence of catalyst particles and a reducing gas under effective hydrothermal processing conditions to produce a multi-phase product, the catalyst particles comprising at least one metal component disposed on a catalyst support;
separating the multi-phase product to produce at least a gas phase portion, a liquid hydrocarbon product, an aqueous portion, and a solids portion, and
hydroprocessing at least a portion of the liquid hydrocarbon product in the presence of a hydroprocessing catalyst under effective hydroprocessing conditions,
wherein the at least a portion of the liquid hydrocarbon product is combined with at least one of a mineral feed and a biocomponent feed prior to hydroprocessing, the biocomponent feed comprising one or more of a vegetable fat or oil, an animal fat or oil, a fish fat or oil, a pyrolysis oil, and an algae oil.

2. The method of claim 1, wherein the effective hydrothermal processing conditions comprise a temperature from about 150° C. to about 500° C. and a pressure from about 4.5 barg (about 450 kPag) to about 300 barg (about 30 MPag).

3. The method of claim 1, wherein the effective hydrothermal processing conditions comprise a partial pressure of reducing gas of at least about 2 bar (200 kPa), wherein the reducing gas comprises hydrogen.

4. The method of claim 1, wherein separating the multi-phase product to produce a solids portion comprises separating the multi-phase product to produce a catalyst portion and a biomass-based solids portion.

5. The method of claim 1, wherein contacting the biomass feed with water under effective hydrothermal processing conditions does not result in a phase change for the water.

6. The method of claim 1, wherein the biomass feed and the water are introduced into the reactor as a mixture of biomass and water.

7. The method of claim 1, wherein the water and the biomass are present in a weight ratio of water to biomass from about 3:1 to about 5:1.

8. The method of claim 1, wherein a weight of the catalyst particles is from about 5 wt % to about 20 wt %, based on weight of the biomass.

9. The method of claim 1, further comprising separating the hydrocarbon liquid product to produce a fraction having at least 90 wt % of its boiling range from about 193° C. to about 360° C.

10. The method of claim 1, wherein the catalyst support comprises titania, zirconia, silica, vanadia, manganese oxide, cerium oxide, activated carbon, magnesium oxide, hydrotalcite, or a combination thereof.

11. The method of claim 10, wherein the catalyst support is substantially free of alumina.

12. The method of claim 10, wherein the at least one metal component comprises Pt, Pd, Rh, Ru, Ir, or a combination thereof.

13. The method of claim 1, wherein the catalyst particle comprises at least one of K, Co, Ni, Mo, and W on a support that comprises titania, zirconia, vanadia, manganese oxide, cerium oxide, or a mixture thereof.

14. The method of claim 1, wherein the biomass feed comprises an algae-based feed.

15. A method for hydrothermally processing biomass, comprising:
contacting a biomass feed with water in the presence of catalyst particles under effective hydrothermal processing conditions to produce a multi-phase product;
separating a liquid hydrocarbon product from the multi-phase product; and
hydroprocessing at least a portion of the liquid hydrocarbon product in the presence of a hydroprocessing catalyst under effective hydroprocessing conditions, wherein the at least a portion of the liquid hydrocarbon product is combined with at least one of a mineral feed and a biocomponent feed prior to hydroprocessing, the biocomponent feed comprising one or more of a vegetable fat or oil, an animal fat or oil, a fish fat or oil, a pyrolysis oil, and an algae oil.

16. The method of claim 15, wherein the hydroprocessing conditions comprise effective catalytic dewaxing conditions including a total pressure from about 400 psig (about 2.8 MPag) to about 1500 psig (about 10.3 MPag), an LHSV from about 0.5 $hr^{-1}$ to about 5.0 $hr^{-1}$, and a treat gas rate front about 500 scf/bbl (about 85 $Nm^3/m^3$) to about 2000 scf/bbl (about 340 $Nm^3/m^3$).

17. The method of claim 15, wherein the effective hydroprocessing conditions comprise effective hydrotreating conditions including a temperature from about 315° C. to about 425° C., a total pressure from about 300 psig (about 2.1 MPag) to about 3000 psig (about 20.6 MPag), an LHSV from about 0.2 $hr^{-1}$ to about 10 $hr^{-1}$, and a hydrogen treat gas rate of about 500 scf/bbl (about 85 $Nm^3/m^3$) to about 10000 scf/bbl (about 1700 $Nm^3/m^3$).

18. A method for hydrothermally processing biomass, comprising:
   contacting a biomass feed with water in the presence of catalyst particles and a reducing gas under effective hydrothermal processing conditions to produce a multi-phase product, the catalyst particles comprising activated carbon or an oxidized metal;
   separating the multi-phase product to produce at least a gas phase portion, a liquid hydrocarbon product, an aqueous portion, and a solids portion, and
   hydroprocessing at least a portion of the liquid hydrocarbon product in the presence of a hydroprocessing catalyst under effective hydroprocessing conditions,
   wherein the at least a portion of the liquid hydrocarbon product is combined with at least one of a mineral feed and a biocomponent feed prior to hydroprocessing, the biocomponent feed comprising one or more of a vegetable fat or oil, an animal fat or oil, a fish fat or oil, a pyrolysis oil, and an algae oil.

19. The method of claim 18, wherein the catalyst particles comprise magnesium oxide or hydrotalcite.

* * * * *